US009160732B2

(12) United States Patent
Ronda et al.

(10) Patent No.: US 9,160,732 B2
(45) Date of Patent: *Oct. 13, 2015

(54) SYSTEM AND METHODS FOR ONLINE AUTHENTICATION

(71) Applicant: SecureKey Technologies Inc., Toronto (CA)

(72) Inventors: Troy Jacob Ronda, Toronto (CA); Pierre Antoine Roberge, Toronto (CA); Patrick Hans Engel, Richmond Hill (CA); Rene McIver, Toronto (CA); Greg Wolfond, Toronto (CA); Andre Boysen, Huntsville (CA)

(73) Assignee: SECUREKEY TECHNOLOGIES INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/068,586

(22) Filed: Oct. 31, 2013

(65) Prior Publication Data
US 2014/0059348 A1    Feb. 27, 2014

Related U.S. Application Data

(63) Continuation of application No. 13/101,059, filed on May 4, 2011, now Pat. No. 8,578,467, which is a
(Continued)

(51) Int. Cl.
*G06F 7/04* (2006.01)
*H04L 29/06* (2006.01)
(Continued)

(52) U.S. Cl.
CPC .............. *H04L 63/08* (2013.01); *H04L 9/3234* (2013.01); *H04L 9/3263* (2013.01); *H04L 63/0853* (2013.01); *G06F 21/00* (2013.01); *H04L 2209/56* (2013.01); *H04L 2209/80* (2013.01)

(58) Field of Classification Search
CPC ........................................................ H04L 9/3234
USPC ........................ 726/9, 10, 20; 713/175, 176
See application file for complete search history.

(56) References Cited

U.S. PATENT DOCUMENTS 6,249,873 B1 *    6/2001   Richard et al. ................... 726/4
7,254,561 B1      8/2007   Sjoblom
(Continued)

FOREIGN PATENT DOCUMENTS

CN    1956376      5/2007
CN    101252435   8/2008
(Continued)

OTHER PUBLICATIONS

Document relating to U.S. Appl. No. 13/202,387, dated Mar. 31, 2014 (Notice of Allowance).
(Continued)

*Primary Examiner* — Christopher Brown
(74) *Attorney, Agent, or Firm* — Bereskin & Parr LLP/S.E.N.C.R.L., s.r.l.

(57) ABSTRACT

A method of establishing a communication channel between a network client and a computer server over a network is described. The network client may be configured to communicate with the computer server over the network and to communicate with a token manager. The token manager may be configured with a parent digital certificate that is associated with the token manager. The token manager or network client generates a credential from the parent digital certificate, and transmits the credential to the computer server. The credential may be associated with the computer server. The network client may establish the communications channel with the computer server in accordance with an outcome of a determination of validity of the credential by, the computer server.

18 Claims, 15 Drawing Sheets

Related U.S. Application Data continuation-in-part of application No. 13/127,672, filed as application No. PCT/CA2009/001594 on Nov. 4, 2009.

(60) Provisional application No. 61/111,318, filed on Nov. 4, 2008, provisional application No. 61/150,851, filed on Feb. 9, 2009, provisional application No. 61/157,239, filed on Mar. 4, 2009, provisional application No. 61/159,434, filed on Mar. 11, 2009, provisional application No. 61/169,112, filed on Apr. 14, 2009, provisional application No. 61/172,934, filed on Apr. 27, 2009, provisional application No. 61/184,162, filed on Jun. 4, 2009, provisional application No. 61/186,185, filed on Jun. 11, 2009.

(51) Int. Cl.
*H04L 9/32* (2006.01)
*G06F 21/00* (2013.01)

(56) References Cited

U.S. PATENT DOCUMENTS

| | | | |
|---|---|---|---|
| 7,353,383 B2 | 4/2008 | Skingle | |
| 7,861,077 B1 | 12/2010 | Gallagher, III | |
| 8,578,467 B2 | 11/2013 | Ronda et al. | |
| 8,756,674 B2 | 6/2014 | Ronda et al. | |
| 8,943,311 B2 | 1/2015 | Ronda et al. | |
| 2001/0037312 A1 | 11/2001 | Gray et al. | |
| 2002/0038296 A1 | 3/2002 | Margolus | |
| 2002/0078150 A1 | 6/2002 | Thompson et al. | |
| 2002/0091646 A1 | 7/2002 | Lake et al. | |
| 2002/0095570 A1 | 7/2002 | Eldridge et al. | |
| 2002/0128977 A1 | 9/2002 | Nambiar et al. | |
| 2002/0161723 A1 | 10/2002 | Asokan et al. | |
| 2002/0169988 A1 | 11/2002 | Vandergeest et al. | |
| 2002/0198848 A1 | 12/2002 | Michener | |
| 2003/0084302 A1 | 5/2003 | de Jong et al. | |
| 2003/0220876 A1 | 11/2003 | Burger et al. | |
| 2003/0226017 A1* | 12/2003 | Palekar et al. | 713/168 |
| 2004/0054625 A1 | 3/2004 | Kellogg et al. | |
| 2004/0064687 A1 | 4/2004 | Pfitzmann et al. | |
| 2004/0107146 A1 | 6/2004 | Alfano | |
| 2004/0260699 A1 | 12/2004 | Aoki et al. | |
| 2005/0010758 A1 | 1/2005 | Landrock et al. | |
| 2005/0273442 A1* | 12/2005 | Bennett et al. | 705/67 |
| 2006/0053296 A1 | 3/2006 | Busboom et al. | |
| 2006/0206709 A1 | 9/2006 | Labrou et al. | |
| 2006/0241975 A1 | 10/2006 | Brown | |
| 2006/0272023 A1 | 11/2006 | Schmeidler et al. | |
| 2007/0022473 A1 | 1/2007 | Hird | |
| 2007/0130463 A1 | 6/2007 | Law et al. | |
| 2007/0169182 A1 | 7/2007 | Wolfond et al. | |
| 2007/0174904 A1 | 7/2007 | Park | |
| 2008/0086771 A1 | 4/2008 | Li et al. | |
| 2008/0212771 A1 | 9/2008 | Hauser | |
| 2008/0256616 A1 | 10/2008 | Guarraci et al. | |
| 2008/0301461 A1* | 12/2008 | Coulier et al. | 713/184 |
| 2009/0028082 A1 | 1/2009 | Wynn et al. | |
| 2009/0138948 A1 | 5/2009 | Calamera et al. | |
| 2009/0239503 A1 | 9/2009 | Smeets | |
| 2010/0031029 A1* | 2/2010 | Ilyadis | 713/156 |
| 2010/0088752 A1* | 4/2010 | Nagulakonda et al. | 726/6 |
| 2010/0185864 A1 | 7/2010 | Gredes et al. | |
| 2011/0265159 A1 | 10/2011 | Ronda et al. | |
| 2011/0302646 A1 | 12/2011 | Ronda et al. | |
| 2011/0307949 A1 | 12/2011 | Ronda et al. | |
| 2012/0072718 A1 | 3/2012 | Ronda et al. | |

FOREIGN PATENT DOCUMENTS

| | | |
|---|---|---|
| EP | 2369811 | 9/2011 |
| EP | 2401838 | 1/2012 |
| EP | 2485453 | 8/2012 |
| WO | 02/48846 | 6/2002 |
| WO | 03/015370 A2 | 2/2003 |
| WO | 2006/021865 A1 | 3/2006 |
| WO | 2006/065002 A1 | 6/2006 |
| WO | 2009/001197 A2 | 12/2008 |
| WO | 2010/004576 | 1/2010 |
| WO | 2010/063091 A2 | 6/2010 |
| WO | 2010/094125 | 8/2010 |

OTHER PUBLICATIONS

Document relating to U.S. Appl. No. 13/127,672, dated Mar. 31, 2014 (Response and Request for Continued Examination).
Pujolle et al., "Secure Session Management with Cookies", Dec. 2009, International Conference on Information, Communications and Signal Processing, ICICS 2009, pp. 1-6.
Document relating to U.S. Appl. No. 13/127,672, dated Jun. 2, 2014 (Notice of Allowance).
Document relating to AU Application No. 2009322102, dated Jan. 14, 2014 (Office Action).
Document relating to AU Application No. 2010215040, dated Jan. 15, 2014 (Office Action).
Document relating to EP Application No. 09829904.3, dated Apr. 3, 2012 (Search Report).
Document relating to EP Application No. 09829904.3, dated Oct. 23, 2012 (Amendment).
Document relating to EP Application No. 10743370.8, dated Jul. 6, 2012 (Search Report).
Document relating to EP Application No. 10743370.8, dated Jan. 24, 2013 (Amendment).
Document relating to EP Application No. 10743370.8, dated Jun. 27, 2013 (Intent to Grant).
Document relating to EP Application No. 11168548.3, dated Aug. 29, 2011 (Search Report).
Document relating to EP Application No. 11168548.3, dated Mar. 28, 2012 (Communication/Reply).
Document relating to EP Application No. 11168548.3, dated Jul. 10, 2012 (Office Action).
Document relating to EP Application No. 11168548.3, dated Jan. 11, 2013 (Response to Office Action).
Document relating to EP Application No. 11181706.0, dated Jul. 6, 2012 (Search Report).
Document relating to EP Application No. 11181706.0, dated Feb. 8, 2013 (Amendment).
Prosecution Documents relating to U.S. Appl. No. 13/101,059, issued as U.S. Pat. No. 8,578,467.
Document relating to U.S. Appl. No. 13/202,387, dated Aug. 30, 2013 (Office Action).
Document relating to U.S. Appl. No. 13/202,387, dated Dec. 27, 2013 (Response to Office Action).
Document relating to U.S. Appl. No. 13/213,414, dated Dec. 7, 2012 (Office Action).
Document relating to U.S. Appl. No. 13/213,414, dated Apr. 8, 2013 (Response to Office Action).
Document relating to U.S. Appl. No. 13/213,414, dated Jul. 18, 2013 (Office Action).
Document relating to U.S. Appl. No. 13/213,414, dated Nov. 8, 2013 (Response to Office Action & RCE).
Document relating to WO Application No. PCTCA2009001594, dated Jun. 21, 2010 (Written Opinion of ISA).
Document relating to WO Application No. PCTCA2009001594, dated Jul. 13, 2010 (International Search Report).
Document relating to WO Application No. PCTCA2009001594, dated Apr. 12, 2011 (IPRP).
Document relating to WO Application No. PCTCA2010000227, dated May 26, 2010 (Written Opinion of ISA).
Document relating to WO Application No. PCTCA2010000227, dated Jun. 15, 2010 (International Search Report).
Document relating to WO Application No. PCTCA2010000227, dated Jun. 2, 2011 (IPRP).
"IPsec", Wikipedia, <http://en.wikipedia.org/w/index.php?title=IPsec&0ldid=249060619>, Jun. 26, 2012.

(56) References Cited

OTHER PUBLICATIONS

Document relating to U.S. Appl. No. 13/127,672, dated Jan. 31, 2013 (Office Action).
Document relating to U.S. Appl. No. 13/127,672, dated Jul. 31, 2013 (Office Action Response).
Document relating to U.S. Appl. No. 13/127,672, dated Oct. 31, 2013 (Final Office Action).
Document relating to U.S. Appl. No. 13/213,414, dated Oct. 17, 2014 (Office Action).
Document relating to EP Application No. 10743370.8, dated Nov. 14, 2013 (Decision to Grant).
Document relating to U.S. Appl. No. 13/127,672, dated Sep. 11, 2014 (Notice of Allowance).
Document relating to U.S. Appl. No. 13/213,414, dated Jan. 16, 2016 (Office Action Response).

* cited by examiner

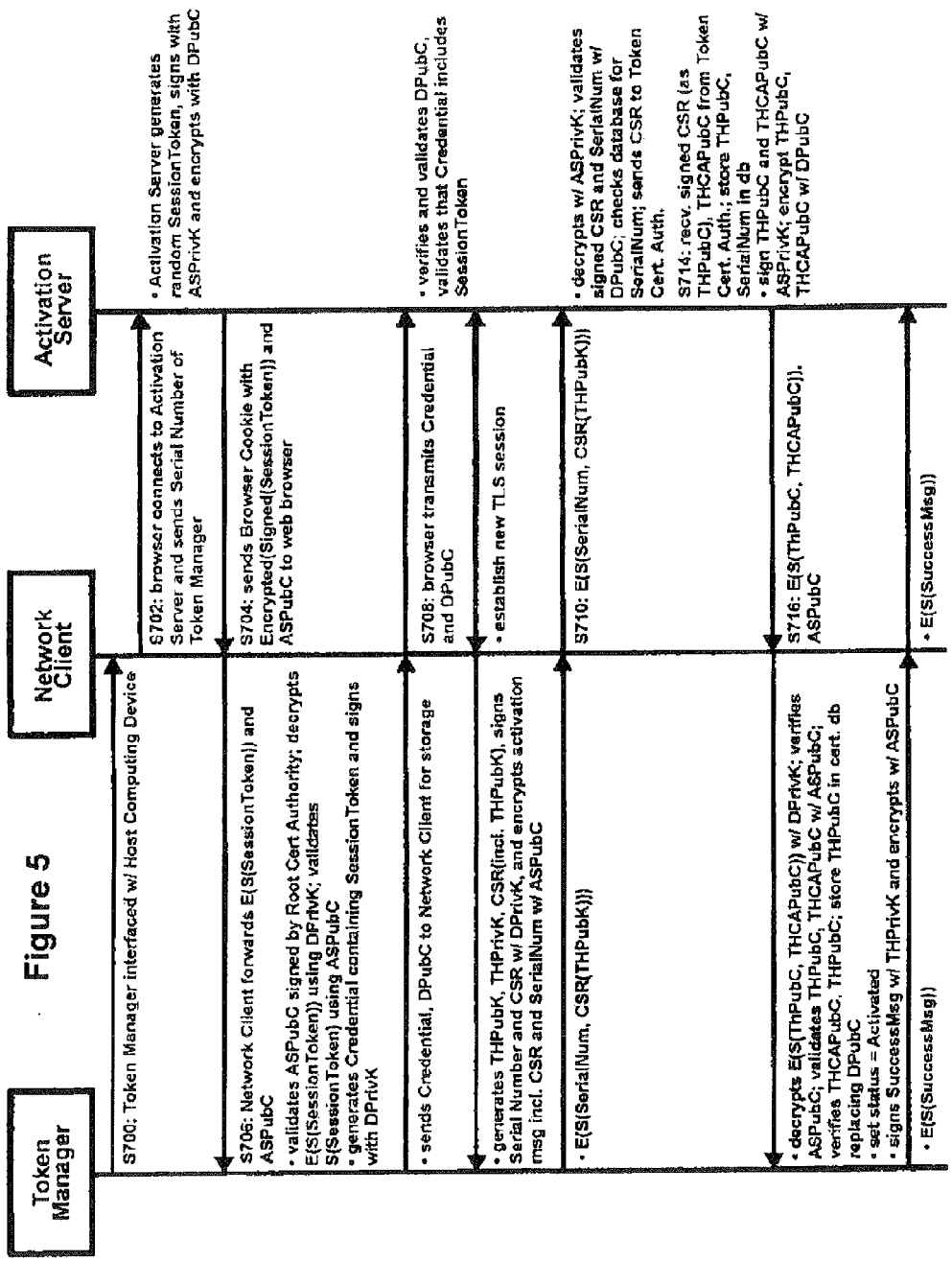

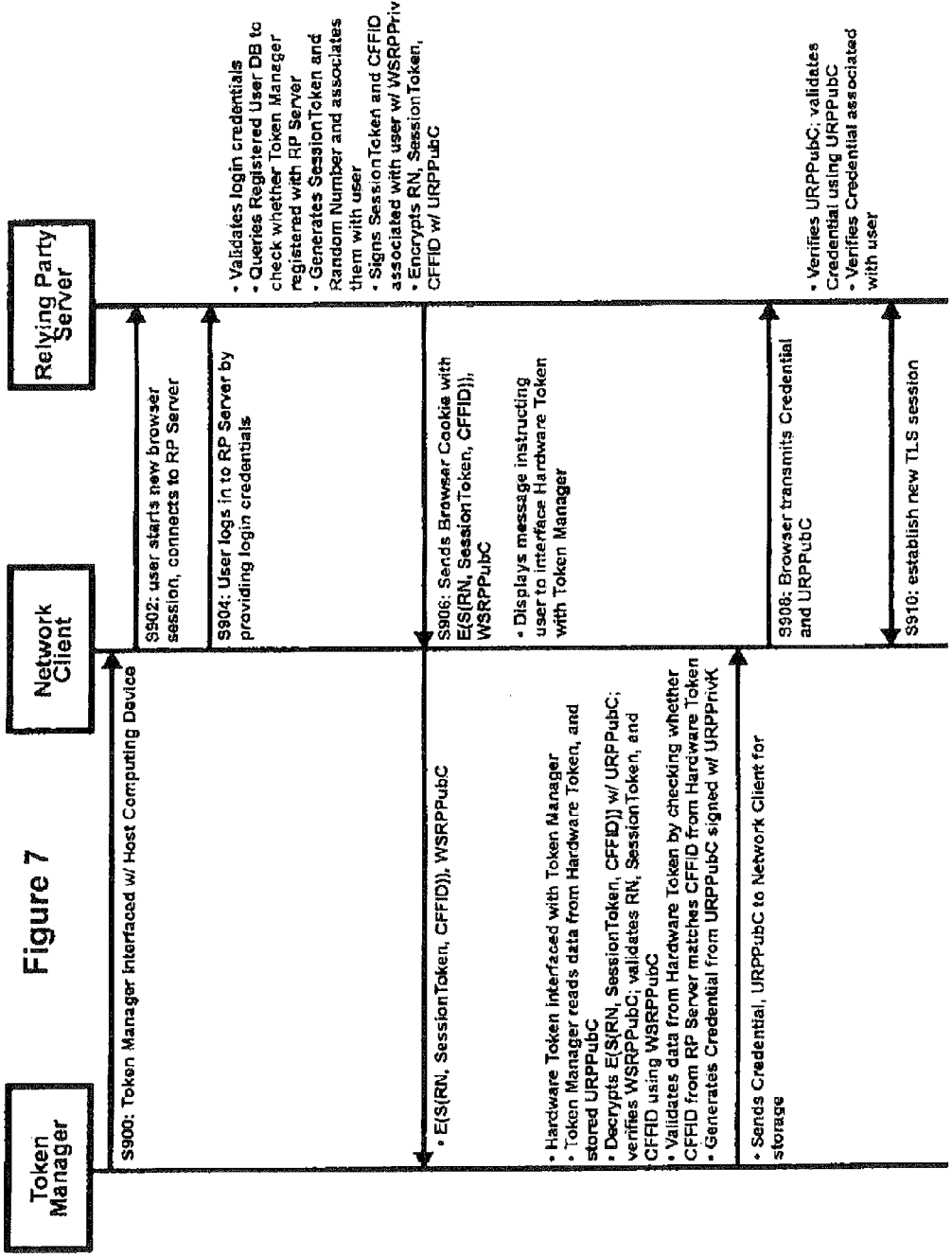

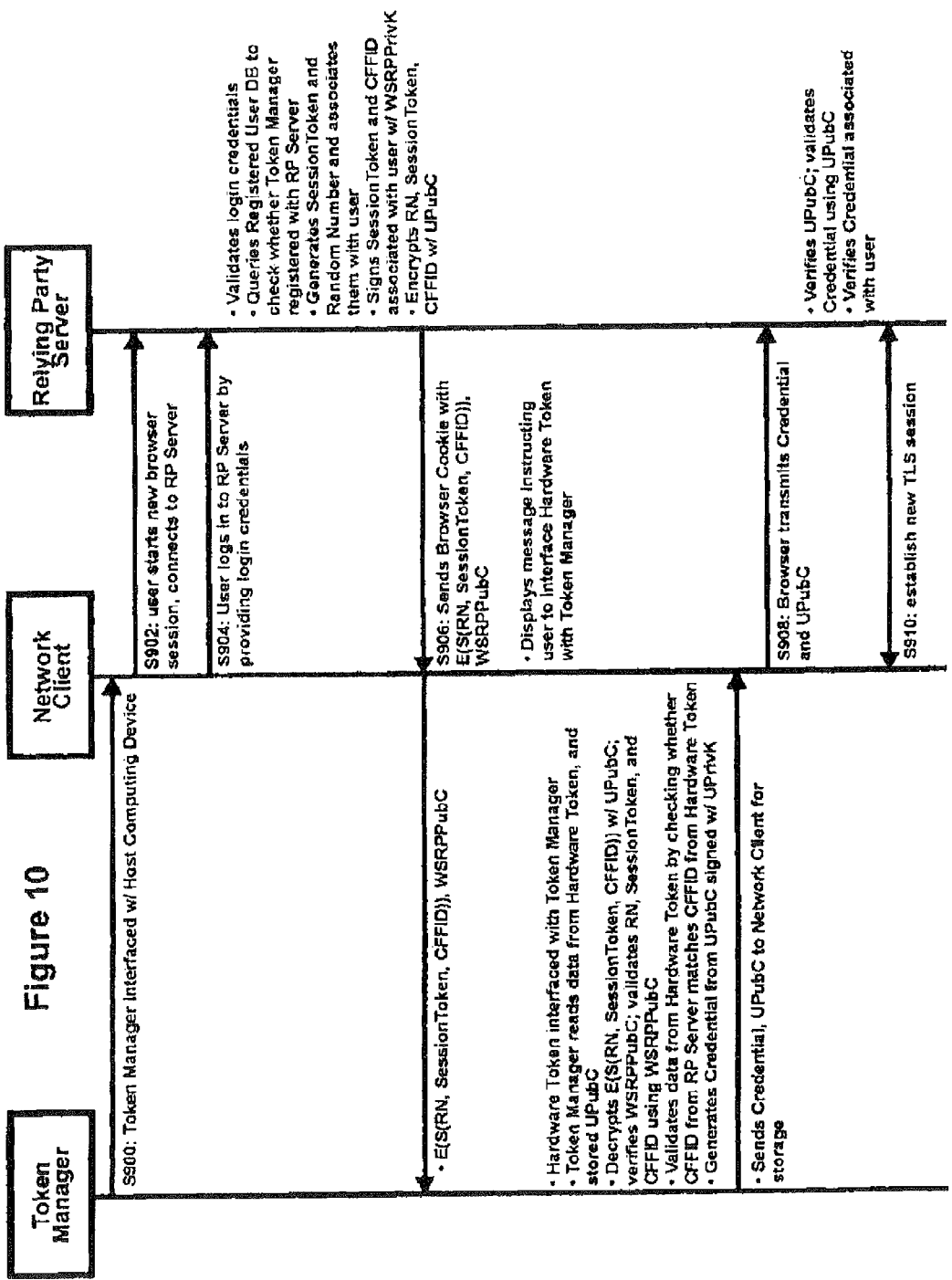

SYSTEM AND METHODS FOR ONLINE AUTHENTICATION

CROSS-REFERENCE TO RELATED APPLICATIONS

This application is a continuation of U.S. patent application Ser. No. 13/101,059, filed May 4, 2011, which is a continuation-in-part of U.S. patent application Ser. No. 13/127,672, filed May 4, 2011, which is a national phase entry of PCT application no. PCT/CA2009/001594, filed Nov. 4, 2009, which claims the benefit of: U.S. provisional patent application No. 61/111,318, filed Nov. 4, 2008, entitled "Method and System of Certificate-Based Session Management"; U.S. provisional patent application No. 61/150,851, filed Feb. 9, 2009, entitled "System and Methods for Online Authentication"; U.S. provisional patent application No. 61/157,239, filed Mar. 4, 2009, entitled "System and Methods for Online Authentication"; U.S. provisional patent application No. 61/159,434, filed Mar. 11, 2009, entitled "System and Methods for Online Authentication"; U.S. provisional patent application No. 61/169,112, filed Apr. 14, 2009, entitled "System and Methods for Online Authentication"; U.S. provisional patent application No. 61/172,934, filed Apr. 27, 2009, entitled "System and Methods for Updating a Payment Card Post Issuance"; U.S. provisional patent application No. 61/184,162, filed Jun. 4, 2009, entitled "System and Methods for Conducting an E-Commerce Transaction Initiated by a Single User Interaction"; and U.S. provisional patent application No. 61/186,185, filed Jun. 11, 2009, entitled "System and Methods for Conducting an E-Commerce Transaction Initiated by a Single User Interaction", the entire contents of each of which are incorporated herein by reference.

FIELD

This patent application relates to systems and methods for network client authentication. In particular, this patent application describes systems and methods for authenticating a network client and a server using a hardware token.

BACKGROUND

The vast majority of computer servers required a username and shared secret for authentication of network clients. Two types of shared secrets are currently used for authentication: static secrets and dynamic secrets.

Static secrets, such as simple passwords, are typically easy to guess and, therefore, are susceptible to fraudulent usage. Complex passwords, although more difficult to guess, tend to get written down and, therefore, are also susceptible to fraudulent usage.

Dynamic secrets, such as One-Time Passwords (OTPs) are becoming increasingly popular. Whereas static secrets are used for each authentication attempt until expiry, dynamic secrets change with each authentication attempt. Dynamic secrets are typically generated by a portable hardware device or authenticator that must remain synchronized with the server that accepts the secret. Although dynamic secrets provide greater protection from fraudulent activity than static secrets, the security of the authentication scheme can be compromised if the portable authenticator is lost or stolen.

Other authentication schemes use a public/private asymmetric key infrastructure for authentication. The hardware cryptographic token that stores the public/private encryption keys is usually protected by a password that is input to the user's computer user. This password can be easily stolen by rogue software running on the user's computer, thereby reducing the security of the private encryption key(s).

SUMMARY

By way of overview, in a first aspect this disclosure relates to a method of establishing a communication channel between a network client and a computer server over a network. The network client may be configured to communicate with the computer server over the network and to communicate with a token manager. The token manager may be configured with a parent digital certificate that is associated with the token manager. As will be described in further detail below, the method involves the token manager or network client generating a credential from the parent digital certificate, and transmitting the credential to the computer server. The credential may be associated with the computer server. The network client may establish the communications channel with the computer server in accordance with an outcome of a determination of validity of the credential by the computer server.

In a first aspect, this disclosure also relates to a communications device that includes an interface that is configured to interface the communications device to a computer, a memory that stores a parent digital certificate associated with the communications device, and a data processor that is coupled to the interface and the memory. The data processor is configured to (i) generate a credential from the parent digital certificate, the credential being associated with a computer server in communication with the computer; (ii) initiate transmission of the credential to the computer server; and (iii) facilitate establishment of a communications channel between the computer and the computer server in accordance with an outcome of a determination of validity of the credential by the computer server.

In one implementation of the first aspect of this disclosure, the credential generating involves the token manager or network client receiving data from a hardware token that is interfaced with the token manager. The credential generating may involve incorporating the data of the hardware token into the credential. The credential generating may involve comparing the data of the hardware token with expected data, and generating the credential in accordance with an outcome of the hardware token data comparing. The token manager or network client may receive the expected data from the computer server.

In one implementation of the first aspect of this disclosure, the parent digital certificate may comprise a public encryption key. The credential generating may involve the token manager generating a pseudo-random code, and the token manager or network client signing the pseudo-random code with a private key that is uniquely associated with the public encryption key. In this case, the credential comprises the signed pseudo-random code, and the private encryption key and the public encryption key may comprise an asymmetric encryption key pair.

In one implementation of the first aspect of this disclosure, the credential generating involves the token manager or network client generating a child digital certificate from the parent digital certificate and signing the child digital certificate with a private encryption key that is uniquely associated with the public encryption key.

The credential generating may involve generating a public encryption key and a private encryption key uniquely associated therewith, and incorporating the generated public encryption key into the child digital certificate. In this case, the generated private encryption key and the generated public encryption key may comprise an asymmetric encryption key pair.

The token manager or network client may receive a session token from the computer server, and the credential generating may involve the token manager or network client incorporating the session token into the child digital certificate. The credential generating may comprise the token manager or network client generating a pseudo-random code and incorporating the pseudo-random code into the child digital certificate. In this case, the pseudo-random code is verifiable by the computer server.

In one implementation of the first aspect of this disclosure, the credential is uniquely associated with the token manager and the computer server.

The communications channel may comprise a mutually-authenticated encrypted communications channel, and may be established using a server digital certificate received from the computer server, after the token manager or network client validates server digital certificate.

Prior to establishing the communications channel, the token manager or network client may receive a signed message from the computer server and authenticate the computer server by verifying the signed message from the server digital certificate. The credential generating may involve the token manager or network client generating the credential in accordance with an outcome of the computer server authenticating. The digitally-signed message may include a server pseudo-random code, and the computer server authenticating may involve the token manager or network client comparing the server pseudo-random code with a pseudo-random code expected for the computer server.

In a second aspect, this disclosure relates to a method of establishing a communication channel between a network client and a computer server over a network. The network client may be configured to communicate with the computer server over the network and to communicate with a token manager. The token manager may be configured with a parent digital certificate associated with the token manager.

As will be described in further detail below, the method involves the computer server receiving a credential from the token manager or network client, and determining the validity of the credential. The computer server may establish the communications channel with the network client in accordance with an outcome of the determining of the validity of the credential. The determining of the validity of the credential may involve verifying that the credential was generated from the parent digital certificate and is associated with the computer server.

In one implementation of the second aspect of this disclosure, the parent digital certificate may comprise a public encryption key. The determining of the validity of the credential may involve verifying that the credential was signed with a private encryption key that is uniquely associated with the public encryption key. In this case, the private encryption key and the public encryption key may comprise an asymmetric encryption key pair.

The credential may comprise data that is associated with a hardware token that is interfaced with the token manager. The determining of the validity of the credential may involve comparing the data of the hardware token with expected data.

In one implementation of the second aspect of this disclosure, a session token is transmitted from the computer server to the token manager or network client. The determining of the validity of the credential may involve comparing the transmitted session token with a session token included in the credential.

The determining of the validity of the credential may comprise comparing a pseudo-random code included in the credential with an expected pseudo-random code. The determining of the validity of the credential may comprise verifying that the credential is uniquely associated with the token manager and the computer server.

The communications channel may comprise a mutually-authenticated encrypted communications channel, and the computer server may transmit a server digital certificate to the network client and establish the encrypted communications channel with the network client from the credential and the server digital certificate in accordance with the outcome of the determining of the validity of the credential.

In a third aspect, this disclosure relates to a method of authenticating a network client to a computer server. The network client may be configured to communicate with the computer server over a network and to communicate with a token manager. The token manager is configured to receive data originating from a hardware token that is interfaced with the token manager. The method involves the token manager or network client generating a credential that is associated with the token manager, and transmitting the credential to the computer server. The network client may receive an authentication payload from the computer server in accordance with a validity of the credential and the data of the hardware token. The authentication payload may facilitate authentication of the network client to the computer server.

In one implementation of the third aspect of this disclosure, the transmitting the credential may involve the token manager or network client determining the validity of the data of the hardware token, and transmitting the credential and the data of the hardware token in accordance with an outcome of the determining the validity of the data of the hardware token. The determining of the validity of the data of the hardware token may involve the token manager or network client comparing the data of the hardware token with expected data received from the computer server. The credential generating may involve the token manager or network client incorporating the data of the hardware token into the credential.

The credential may be uniquely associated with the token manager and the computer server. The hardware token may be associated with an entity other than the computer server.

In one implementation of the third aspect of this disclosure, the token manager is configured with a parent digital certificate that is associated with the token manager. The parent digital certificate may include a public encryption key. The credential generating may involve the token manager or network client generating the credential from the parent digital certificate.

The credential generating may involve the token manager generating a pseudo-random code, and the token manager or network client signing the pseudo-random code with a private key that is uniquely associated with the public encryption key. In this case, the credential comprises the signed pseudo-random code, and the private encryption key and the public encryption key may comprise an asymmetric encryption key pair.

The credential generating may comprise the token manager or network client generating a child digital certificate from the parent digital certificate and signing the child digital certificate with a private encryption key that is uniquely associated with the public encryption key.

The credential generating may involve the token manager or network client generating a public encryption key and a private encryption key that is uniquely associated therewith, and incorporating the generated private encryption key into the child digital certificate. The generated private encryption key and the generated public encryption key may comprise an asymmetric encryption key pair.

The token manager or network client may receive a session token from the computer server. The credential generating may comprise the token manager or network client incorporating the session token into the child digital certificate.

The credential generating may involve the token manager or network client generating a pseudo-random code, and incorporating the pseudo-random code into the child digital certificate. In this case, the pseudo-random code is verifiable by the computer server.

In one implementation of the third aspect of this disclosure, the token manager or network client may receive a server digital certificate associated with the computer server. The credential generating may involve the token manager or network client generating the credential after validating the server digital certificate.

Prior to the network client receiving an authentication payload from the computer server, the token manager or network client may receive a signed message from the computer server and authenticate the computer server by verifying the signed message from the server digital certificate and the parent digital certificate. The generating a credential may involve the token manager or network client generating the credential in accordance with an outcome of the computer server authenticating.

The digitally-signed message may include a server pseudo-random code. The computer server authenticating may involve the token manager or network client comparing the server pseudo-random code with a pseudo-random code expected for the computer server.

In a fourth aspect, this disclosure relates to a method of authenticating a network client to a computer server. The network client may be configured to communicate with the computer server over a network and to communicate with a token manager. The method involves the computer server receiving a credential from the token manager or network client. The computer server may transmit an authentication payload to the network client in accordance with a determination of the validity of the credential and data originating from a hardware token interfaced with the token manager. The authentication payload facilitates authentication payload of the network client to the computer server.

In one implementation of the fourth aspect of this disclosure, the determination of the validity may involve the computer server comparing the data of the hardware token with expected data. The determination of the validity may involve the computer server verifying that the credential is associated with the token manager. The determination of the validity may involve the computer server verifying that the credential is uniquely associated with the token manager and the computer server.

In one implementation of the fourth aspect of this disclosure, the token manager may be configured with a parent digital certificate that is associated with the token manager. The parent digital certificate may comprise a public encryption key. The determination of the validity may involve verifying that the credential was signed with a private encryption key uniquely associated with the public encryption key. In this case, the private encryption key and the public encryption key comprise an asymmetric encryption key pair.

The determination of the validity may involve comparing a pseudo-random code that is included in the credential with an expected pseudo-random code.

In one implementation of the fourth aspect of this disclosure, a server pseudo-random code may be transmitted from the computer server to the token manager or network client.

The determination of the validity may involve comparing the server pseudo-random code with a pseudo-random code that is included in the credential. The determination of validity may comprise a determination of a correlation between identifying data of the token manager and identifying data of the hardware token, with a previous token manager-hardware token association.

BRIEF DESCRIPTION OF THE DRAWINGS

The foregoing aspects of the disclosure will now be described, by way of example, with reference to the accompanying drawings, in which:

FIG. 5 is a message flow diagram that depicts the transmission of messages during an Activation process implemented by a first embodiment of the Token Manager;

FIG. 7 is a message flow diagram that depicts the transmission of messages during an Authentication process implemented by the first embodiment of the Token Manager;

FIG. 10 is a message flow diagram that depicts the transmission of messages during an Authentication process implemented by the second embodiment of the Token Manager.

DETAILED DESCRIPTION

Communications Device 200

Figure 1:
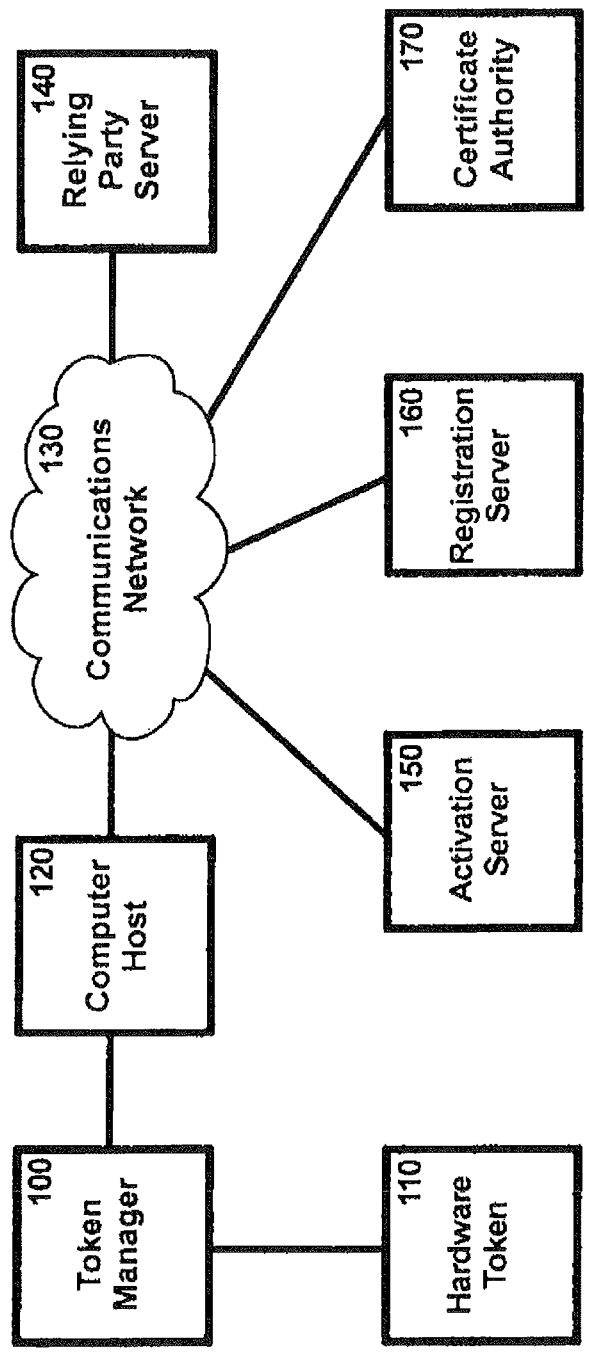
FIG. 1 is a block diagram illustrating the interconnection of the Token Manager, the Computer Host, the Activation Server, the Registration Server, and the Relying Party Server.

Turning to FIG. 1, there is shown a Computer Host 120, one or more Relying Party Servers 140, one or more Activation Servers 150, one or more Registration Servers 160, and a Certificate Authority 170. Although the Computer Host 120, Relying Party Server 140, Activation Server 150, Registration Server 160, and Certificate Authority 170 are shown being interconnected by a single communications network 130, the communications network 130 may comprise one or more different networks. Further, although the Token Manager 100 is shown being in direct communication with the Computer Host 120, it should be understood that the Token Manager 100 and the Computer Host 120 need not be implemented as separate computing devices; rather, the functionality of the Token Manager 100 may be embedded within the Computer Host 120 such that the Token Manager 100 and the Computer Host 120 comprise a single computing device.

The hardware token 110 is used herein as a form of portable authenticator, and may be implemented as a contactless form factor, a contact form factor (e.g. magnetic stripe), or other NFC and/or ISO 14443 based form factors. Suitable implementations of the hardware token 110 include a smartcard, a payment card, a credit card, a loyalty card, a building access pass, a driver's licence, a health card, and a passport.

The Token Manager 100 may communicate with the hardware tokens 110 over a contactless protocol, such as ISO 14443. Alternately, the Token Manager 100 may communicate with the hardware tokens 110 without a wireless link. Although the hardware token 110 is shown being in direct communication with the Token Manager 100, the hardware token 110 and the Token Manager 100 need not be implemented as separate devices; rather, the functionality of the hardware token 110 may be embedded within the Token Manager 100 such that the hardware token 110 and the Token Manager 100 comprise a single device.

Figure 2:
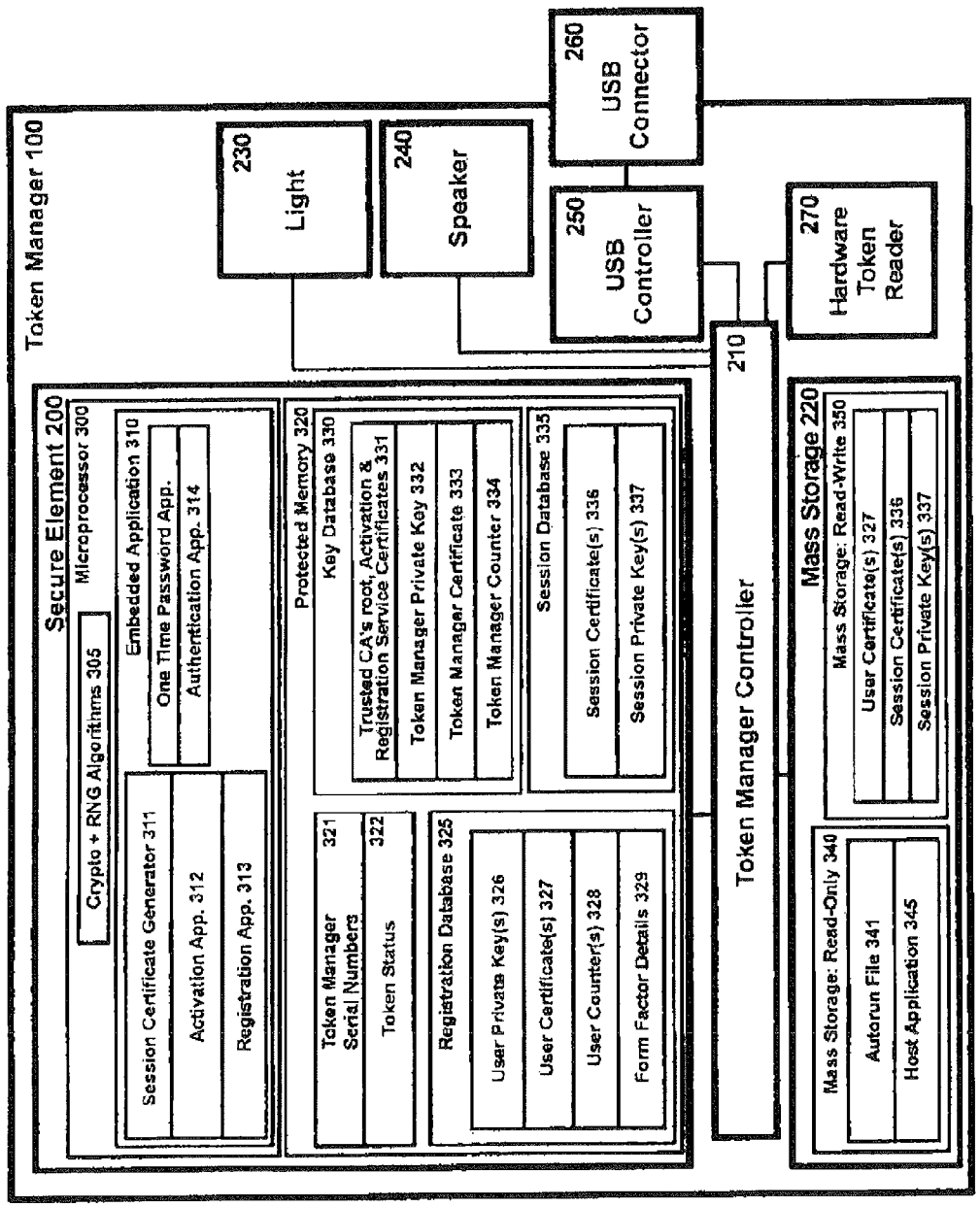
FIG. 2 is a detailed schematic view of the Token Manager.

As shown in FIG. 2, the Token Manager 100 may comprise a Secure Element 200, a Token Manager Controller 210, and a mass memory storage 220. The Token Manager 100 may be implemented as a portable USB device, in which case the Token Manager 100 may also include a multi-colour light emitting device (Light) 230, a sound emitting device (Speaker) 240, a USB controller 250, and a USB connector 260. The Token Manager 100 may have an embedded contactless or contact (e.g. magnetic stripe) token reader/writer interface 270 that allows the Token Manager 100 to communicate with a hardware token 110.

The Token Manager 100 may connect to a Computer Host 120 using the USB Connector 260. The USB connector 260 and USB controller 250 provide USB connectivity between the Token Manager 100 and the Computer Host 120. Alternately, the Token Manager 100 may be implemented as a self-contained contactless form factor having a wireless (e.g. Bluetooth) contactless interface (not shown) that allows the Token Manager 100 to communicate with a wireless contactless reader that is connected to, or configured within, the Computer Host 120. The multi-colour light emitting device (Light) 230 is used to visually notify the user of the internal status of the Token Manager 100 when connected to a Computer Host 120.

Preferably, the Secure Element 200 is implemented using smart card technology with a built-in micro-processor (sometimes called a micro-controller or crypto-processor) and protected memory for secure storage. The Secure Element 200 provides a protected self-contained computing environment used for running cryptographic algorithms as well as proprietary applications stored within the Token Manager 100. It also allows for storing data that is either never released to the operating system of the user's Computer Host 120 or only released when specific access conditions, managed by the Secure Element's 200 micro-processor, are met.

As shown, the Secure Element 200 is divided into a microprocessor area 300 and a protected memory area 320. The microprocessor 300 provides processing capabilities such as cryptographic algorithms and random number generator algorithms 305 and may be used to run proprietary embedded applications 310, such as a Session Certificate Generator 311, an Activation procedure application 312, a Registration procedure application 313, and an Authentication procedure application 314.

Preferably, the Session Certificate Generator 311, Activation procedure application 312, Registration procedure application 313, and Authentication procedure application 314 are implemented as a set of computer processing instructions that are executed by the microprocessor area 300. However, the functionality of the Session Certificate Generator 311, Activation procedure application 312, Registration procedure application 313, and Authentication procedure application 314 may instead be implemented in electronics hardware. For example, any of the Session Certificate Generator 311, Activation procedure application 312, Registration procedure application 313, and Authentication procedure application 314 may be implemented as a Field Programmable Gate Array (FPGA) or a Complex Program Logic Device (CPLD).

The protected memory 320 is used to store sensitive information required for implementation of the methods described herein, such as a Token Manager Serial Numbers 321, Token Status 322. The protected memory 320 also includes a Registration Database 325, a Key Database 330, and a Session Database 335. The Registration database 325 includes zero or more User Private Keys 326, User Certificates 327, and Form Factor details 329. The Key Database 330 includes the root certificate from a Trusted Certificate Authority, as well as an Activation service certificate and a Registration service certificate 331. The Key Database 330 also includes a Token Manager Private Key 332 and a Token Manager Certificate 333. The Session Database 335 includes zero or more Session certificates 336 and Session Private Keys 337.

The Mass-storage area 220 includes a read-only partition 340 and optionally a read-write partition 350. Preferably, the read-only partition 340 is exposed to the Computer Host 120 when the Token Manager 100 is connected to the Computer Host 120 and may include an autorun file 341 and a Network Client 345. The Autorun file 341 contains the minimum instructions to the Computer Host 120 for running the Network Client 345. The optional Read-Write partition 350 can be used to expose the Computer Host 120 to one or more User Certificate(s) 327, Session Certificate 336 and Session Private Key 337.

The function of the foregoing artefacts will become apparent from the following discussion.

Figure 3:
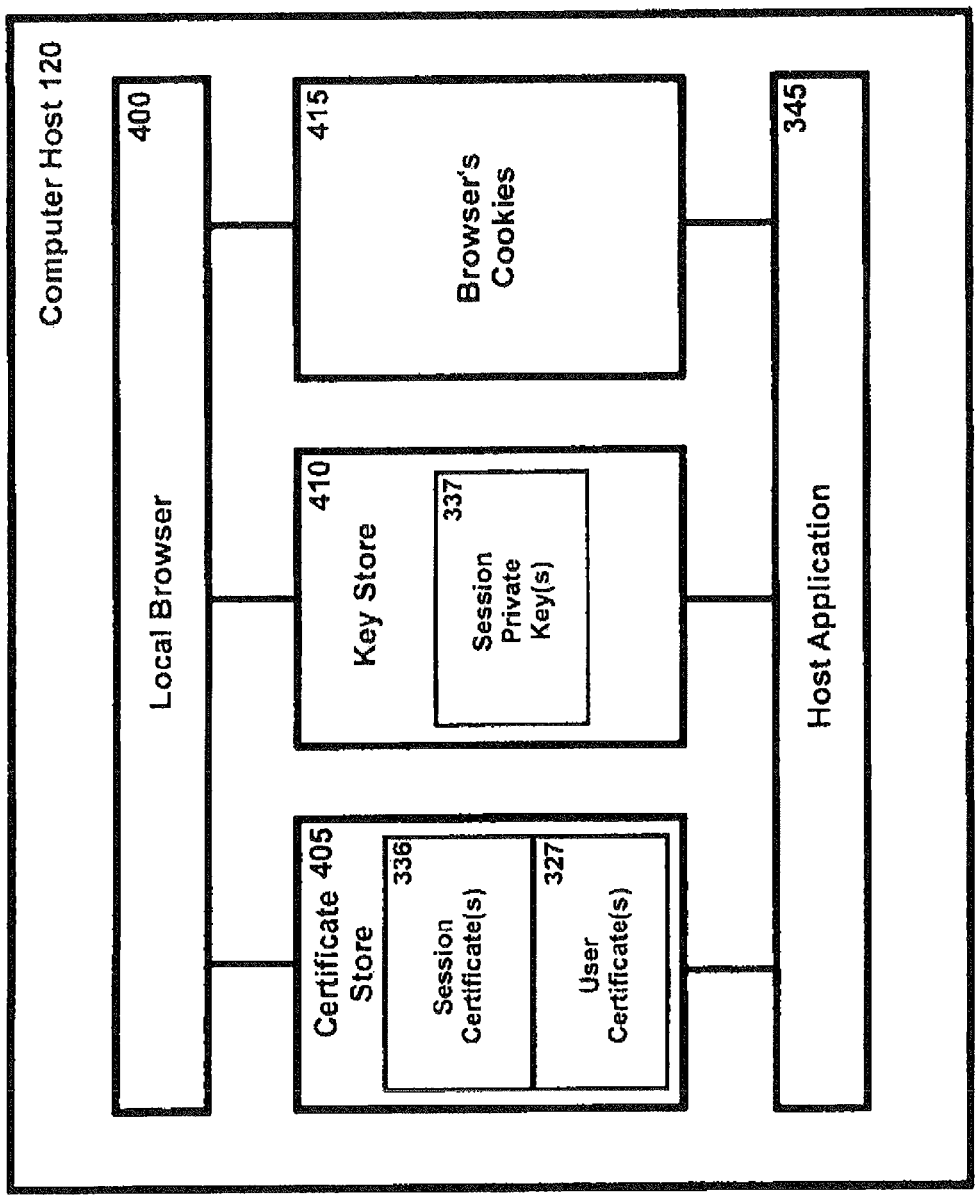
FIG. 3 is a schematic view of the Computer Host.

The Computer Host 120 comprises a networked computing device, and may be implemented as a personal computer, a data messaging device, a two-way pager, a wireless e-mail device, a wireless telephone, a wireless Internet appliance, as examples. As shown in FIG. 3, the Computer Host 120 comprises a Network Client 345, a local browser 400, a Certificate Store 405, a Key Store 410, and a browser cookies store 415. The Network Client 345 has interfaces with the Certificate Store 405, the Key Store 410 and the browser cookies store 415. Depending on the Computer Host configuration, the Session Certificate(s) 336 and User Certificate(s) 327 might be stored in the computer host Certificate Store 405. Similarly, the Session Private Key(s) 337 might be stored in the Key Store 410. The browser 400 interfaces with the Certificate Store 405, the Key Store 410 and browser cookies store 415, and is used to facilitate communication with the Relying Party Server 140, the Activation Server 150, and the Registration Server 160 over the communications network 130.

Figure 4A:
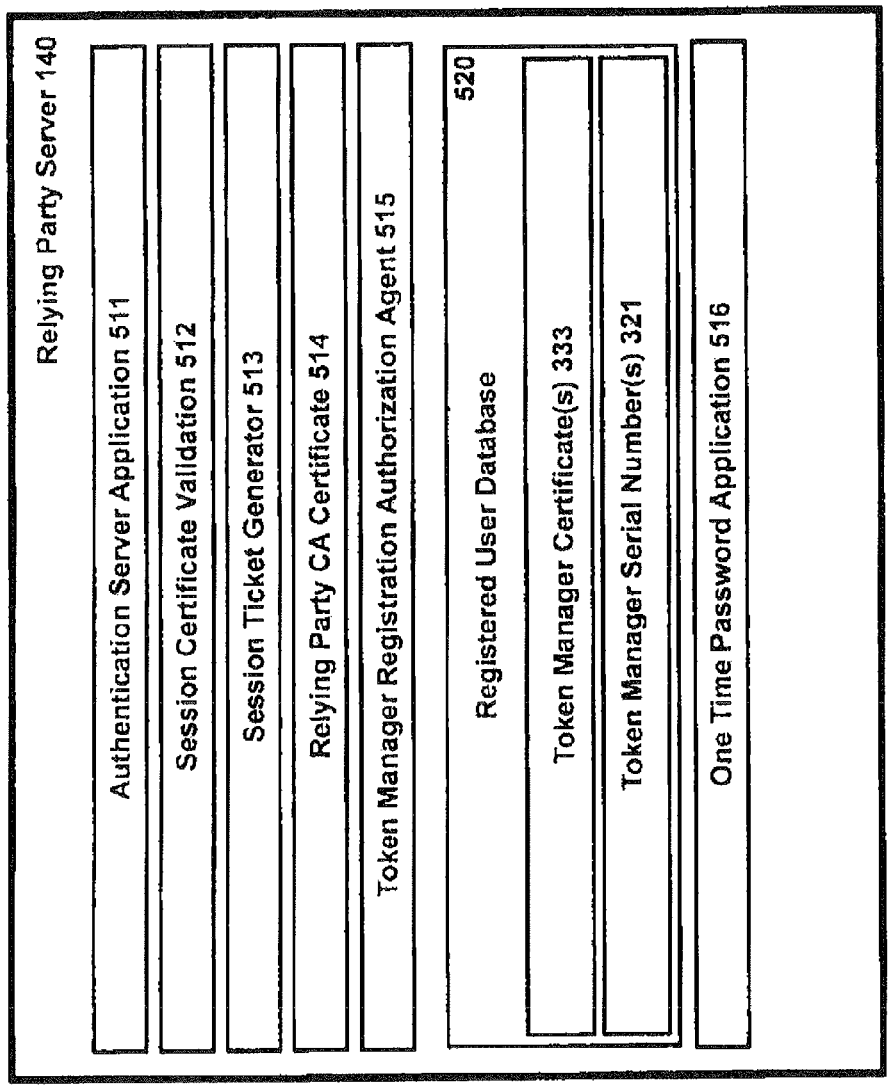
FIG. 4a is a schematic view of the Relying Party Server.
Figure 4B:
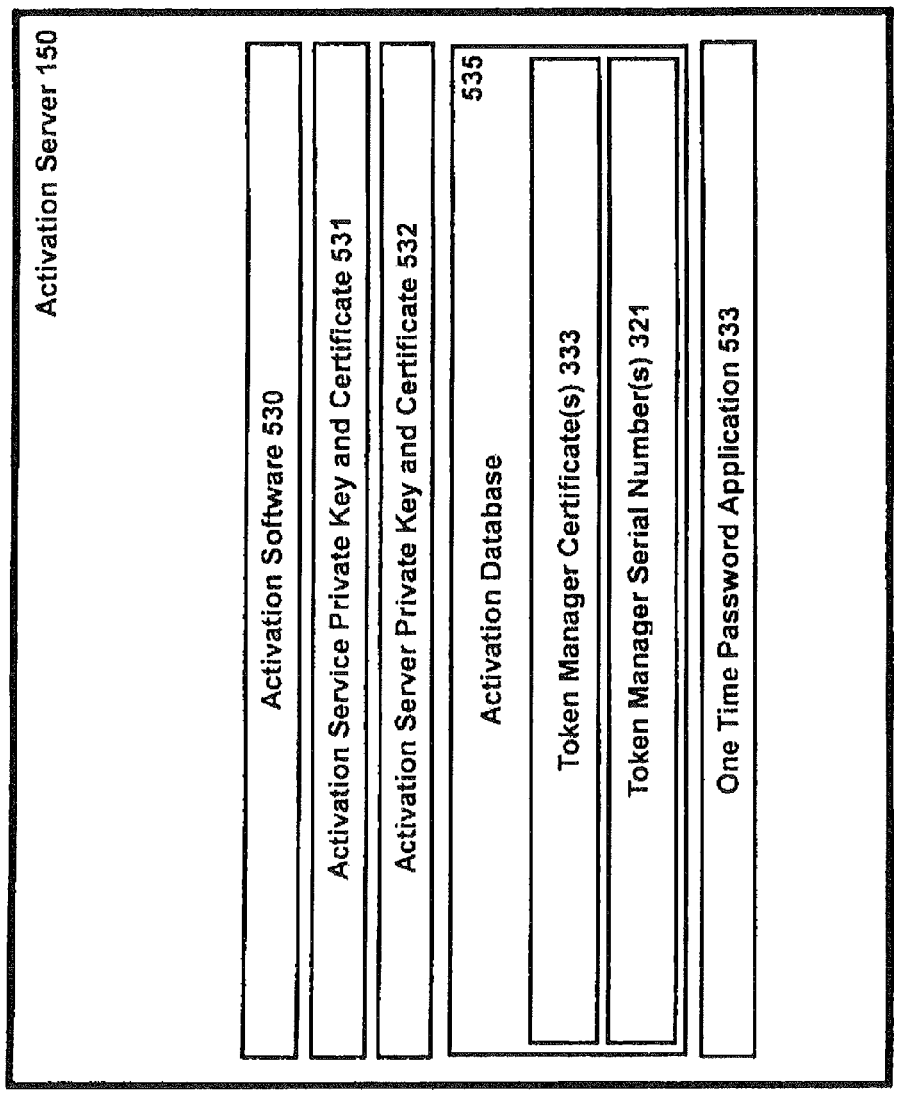
FIG. 4b is a schematic view of the Activation Server.

Preferably, the Relying Party Server 140, Activation Server 150, and Registration Server 160 are implemented as computer web servers, and communicate with the Certificate Authority 170 via a secure protocol over the communications network 130. As shown in FIG. 4b, the Activation Server 150 includes Activation Software 530, an Activation Service Private Key and Certificate 531, an Activation Server Private Key and Certificate 532, an optional One Time Password application 533, and an Activation Database 535. The Activation Database 535 includes zero or more records of Token Manager Certificates 533 and Token Manager Serial Numbers 321. The Activation Server 150 uses the Activation Software 530 to implement the Token Manager Activation process (described below).

Figure 4C:
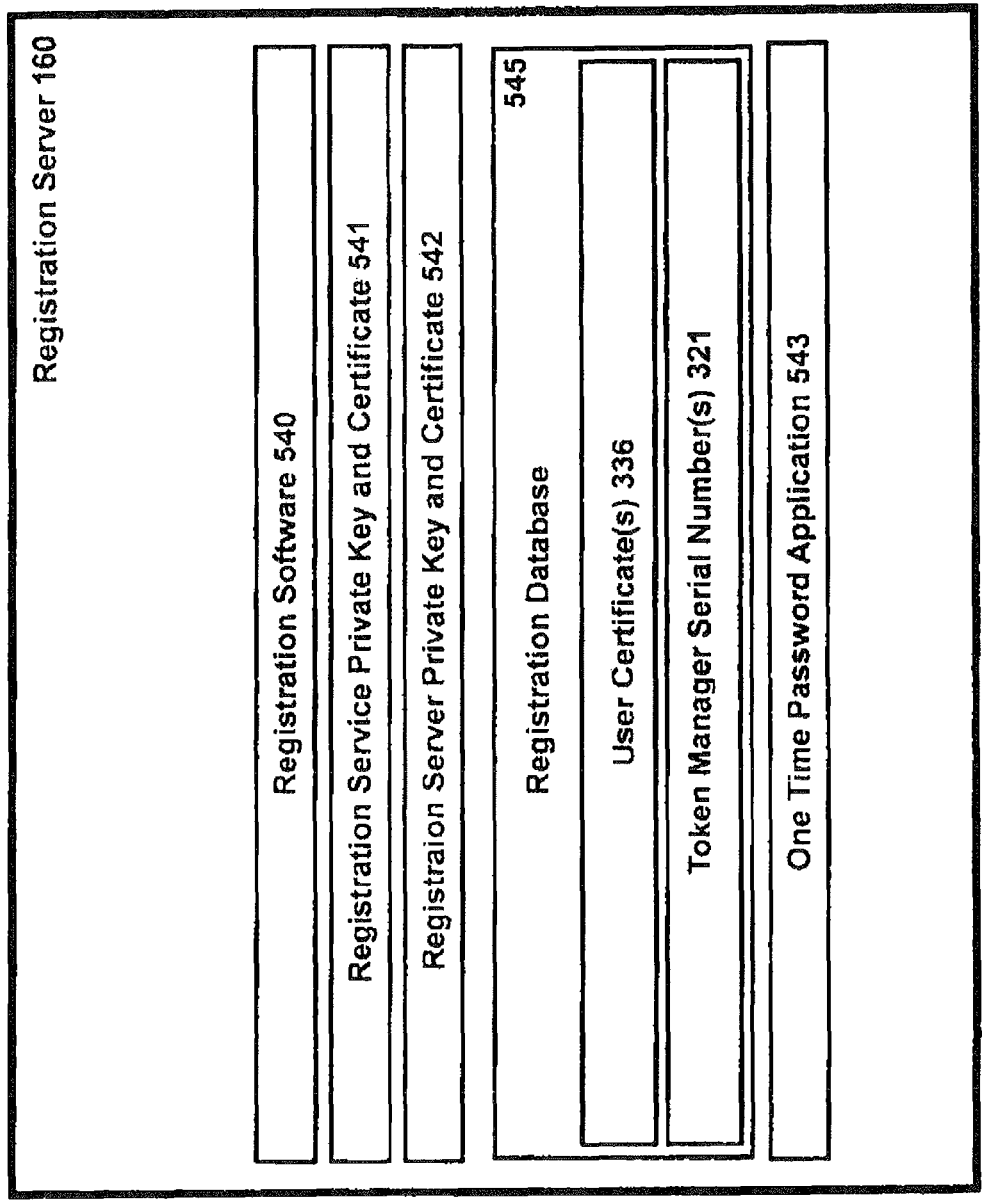
FIG. 4c is a schematic view of the Registration Server.

As shown in FIG. 4c, the Registration Server 160 includes Registration Software 540, a Registration Service Private Key and Certificate 541, a Registration Server Private Key and Certificate 542, an optional One Time Password application 543, and a Registration Database 545. The Registration Database 545 includes zero or more records of User Certificates 336 and Token Manager Serial Numbers 321. The Registration Server 160 uses the Registration Software 540 to implement the Token Manager Registration process (described below).

Once a Token Manager 100 has been activated (via the Activation Server 150), and registered with a Relying Party (via the Registration Server 160), the Token Manager 100 can be authenticated to communicate with the Relying Party Server 140 with which the Token Manager 100 was registered. The authentication process, if successful, provides the user with access to the Relying Party's online applications. As shown in FIG. 4a, the Relying Party Server 140 includes an Authentication Server Application 511, a Session Certificate Validation application 512, a Session Ticket Generator 513, a Relying Party CA Certificate 514, a Token Manager Registration Authorization Agent 515, an optional One Time Password application 516, and a Registered User Database 520. The Registered User Database 520 includes zero or more Token Manager Certificates 333 and Token Manager Serial Numbers 321. The Relying Party Server 140 uses the Authentication Server Application 511 to implement the Token Manager Activation process (described below).

Preferably, the Token Manager Activation process and the Token Manager Registration process requires the generation of signed certificates from one or more Certificate Authorities 170. Preferably, the Certificate Authority 170 includes a Root Certificate Authority, a Token Manager Certificate Authority, and a Relying Party (RP) Certificate Authority. The Token Manager Certificate Authority and the RP Certificate Authority may be completely separate Certificate Authorities with self signed root certificates, or they may be subordinate Certificate Authorities to the Root Certificate Authority.

Functional details of the Token Manager 100, the Relying Party Server 140, the Activation Server, and the Registration Server 160 will be discussed with reference to FIGS. 5 to 10.

Token Manager 100

The Token Manager 100 interfaces with a network client of the Computer Host 120. The network client is configured to communicate with the computer server over the communications network 130 and to communicate with the Token Manager 100.

As will become apparent, the Token Manager 100 facilitates the establishment of a communications channel between the network client and the computer server over the communications network 130. The Token Manager 100 is configured with a parent digital certificate that is associated with the Token Manager 100. To establish the communications channel, the Token Manager 100 (or the network client) generates a credential from the parent digital certificate. The credential is associated with the computer server. The Token Manager 100 (or network client) transmits the credential to the computer server. The network client establishes the communications channel with the computer server in accordance with an outcome of a determination of validity of the credential by the computer server.

As will be explained in detail below, the Token Manager 100 (or the network client) may generate the credential from a hardware token 110 that is interfaced with the Token Manager 100, and may incorporate data from the hardware token into the credential. The Token Manager 100 (or the network client) may compare the data of the hardware token with expected data, and generate the credential in accordance with an outcome of the comparison. The Token Manager 100 (or network client) may receive the expected data from the computer server.

The parent digital certificate may be uniquely associated with the Token Manager 100 and the computer server. Preferably, the parent digital certificate comprises a public encryption key, and the credential is generated by the Token Manager 100 generating a pseudo-random code that is verifiable by the computer server, and the Token Manager 100 (or network client) signing the pseudo-random code with a private key that is uniquely associated with the public encryption key. In this case, the credential comprises the signed pseudo-random code. The private encryption key and the public encryption key may comprise an asymmetric encryption key pair.

The Token Manager 100 (or network client) may generate the credential by generating a child digital certificate from the parent digital certificate and signing the child digital certificate with a private encryption key that is uniquely associated with the public encryption key. The Token Manager 100 (or network client) may generate a public encryption key and a private encryption key that is uniquely associated with the generated public encryption, and incorporate the generated public encryption key into the child digital certificate. In this case, the generated private encryption key and the generated public encryption key may comprise an asymmetric encryption key pair.

The Token Manager 100 (or network client) may incorporate the pseudo-random code into the child digital certificate. The Token Manager 100 (or network client) may receive a session token from the computer server, and may incorporate the session token into the child digital certificate.

The communications channel may comprise a mutually-authenticated encrypted communications channel, and may be established using a server digital certificate received from the computer server after the Token Manager 100 (or network client) validates the server digital certificate. Prior to establishing the communications channel, the Token Manager 100 (or network client) may receive a signed message from the computer server and may authenticate the computer server by verifying the signed message from the server digital certificate and the parent digital certificate. The Token Manager 100 (or network client) may generate the credential in accordance with an outcome of the computer server authenticating.

The digitally-signed message may include a server pseudo-random code, and the Token Manager 100 (or network client) may authenticate the computer server by comparing the server pseudo-random code with a pseudo-random code expected for the computer server.

As will become apparent, in addition to facilitating the establishment of a communications channel between the network client and the computer server, the Token Manager 100 also facilitates authentication of the network client to the computer server. The Token Manager 100 is configured to receive data from a hardware token 110 that is interfaced with the Token Manager 100. To facilitate the authentication of the network client, the Token Manager 100 (or network client) generates a credential that is associated with the Token Manager 100, and transmits the credential to the computer server. In response, the network client receives an authentication payload from the computer server in accordance with a validity of the credential and the data of the hardware token 110. The authentication payload facilitates the authentication of the network client to the computer server.

As will be explained in detail below, the Token Manager 100 (or network client) may determine the validity of the data of the hardware token 110, and transmit the credential and the data of the hardware token 110 in accordance with the outcome of the validity determination. The Token Manager 100 (or network client) may determine the validity of the data of the hardware token 110 by comparing the data of the hardware token 110 with expected data received from the computer server. The Token Manager 100 (or network client) may incorporate the data of the hardware token 110 into the credential.

The credential may be uniquely associated with the Token Manager 100 and the computer server. The hardware token 110 may be associated with an entity other than the computer server.

The Token Manager 100 may be configured with a parent digital certificate that is associated with the Token Manager 100. The parent digital certificate may include a public encryption key, and the Token Manager 100 (or network client) may generate the credential from the parent digital certificate.

The Token Manager 100 may generate a pseudo-random code, and the Token Manager 100 (or network client) may generate the credential by signing the pseudo-random code with a private key that is uniquely associated with the public encryption key. In this case, the credential comprises the signed pseudo-random code. The private encryption key and the public encryption key may comprise an asymmetric encryption key pair.

The Token Manager 100 (or network client) may generate the credential by generating a child digital certificate from the parent digital certificate and signing the child digital certificate with a private encryption key that is uniquely associated with the public encryption key. The Token Manager 100 (or network client) may generate a public encryption key and a private encryption key that is uniquely associated with the generated public encryption key, and incorporate the generated public encryption key into the child digital certificate. The generated private encryption key and the generated public encryption key may comprise an asymmetric encryption key pair.

The Token Manager 100 (or network client) may receive a session token from the computer server, and may incorporate the session token into the child digital certificate. The Token Manager 100 (or network client) may generate a pseudo-random code that is verifiable by the computer server, and incorporate the pseudo-random code into the child digital certificate.

The Token Manager 100 (or network client) may receive a server digital certificate that is associated with the computer server, and may generate the credential after validating the server digital certificate. Prior to the network client receiving the authentication payload from the computer server, the Token Manager 100 (or network client) may receive a signed message from the computer server and authenticate the computer server by verifying the signed message from the server digital certificate and the parent digital certificate. The Token Manager 100 (or network client) may generate the credential in accordance with an outcome of the computer server authenticating.

The digitally-signed message may include a server pseudo-random code. The Token Manager 100 (or network client) may authenticate the computer server by comparing the server pseudo-random code with a pseudo-random code expected for the computer server.

Two sample embodiments of the Token Manager 100 will now be briefly discussed. To provide the foregoing results, each embodiment of the Token Manager 100 may be configured to implement an Activation process, a Registration Process and an Authentication process.

As will be explained in further detail below, the Activation Process is optional in the first embodiment of the Token Manager 100, and causes the Token Manager 100 to be provided with a Token Manager private key THPrivK and a Certificate Authority-signed Token Manager public certificate THPubC that includes a Token Manager public key THPubK corresponding to the Token Manager private key THPrivK. The Registration process causes the Token Manager 100 to be provided with a User private key URPPrivK and a Certificate Authority-signed User-Relying Party public certificate (a parent digital certificate) URPPubC that includes a User public key URPPubK corresponding to the User private key URPPrivK. The Token Manager 100 uses the User-Relying Party public certificate URPPubC and identifying data from the hardware token 110 to register the Token Manager 100 for use with one of the Relying Party Servers 140.

In the first embodiment, the User-Relying Party public certificate URPPubC is unique for each Relying Party Server 140. Therefore, each User-Relying Party public certificate URPPubC is uniquely associated with the Token Manager 100 and a respective Relying Party Server 140, and the Registration process establishes an association between the User-Relying Party public certificate URPPubC and a hardware token 110 provided or trusted by the associated Relying Party. The Registration process may also establish an association between the User-Relying Party public certificate URPPubC, the hardware token 110 and the Token Manager 100. The Authentication process causes the Token Manager 100 to use the User-RP Public Certificate URPPubC to authenticate itself with the respective Relying Party Server 140.

As will be explained in further detail below, in the second embodiment of the Token Manager 100 the Activation process causes the Token Manager 100 to be provided with a single User private key UPrivK and a single Certificate Authority-signed User public certificate (a parent digital certificate) UPubC that includes a User public key UPubK corresponding to the User private key UPrivK. The Registration process causes the Token Manager 100 to use the User public certificate UPubC and a hardware token 110 to register the Token Manager 100 for use with each Relying Party Server 140. In contrast to the first embodiment, the User public certificate UPubC is common to each Relying Party Server 140. However, consistent with the first embodiment, the Registration process establishes an association between the User Public Certificate UPubC and the hardware token 110 provided or trusted by the associated Relying Party. The Registration process may also establish an association between the User Public Certificate UPubC, the hardware token 110 and the Token Manager 100. The Authentication process causes the Token Manager 100 to use the same user digital certificate UPubC to authenticate itself with each of the Relying Party Servers 140.

Token Manager Activation (Embodiment #1)

The Activation process that is implemented by the first embodiment of the Token Manager 100 will now be described with reference to FIG. 5. In this embodiment, the Token Manager 100 may include a Distribution Public Certificate DPubC, and a corresponding Distribution private encryption key DPrivK, both of which were installed on the Token Manager 100 at the time the Token Manager 100 was manufactured and distributed to the end user. Preferably, the Distribution Public Certificate DPubC is uniquely associated with the Token Manager 100. The Distribution Public Certificate DPubC includes a Distribution public encryption key DPubK. Preferably, the Distribution public encryption key DPubK and the Distribution private encryption key DPrivK comprise an asymmetric encryption key pair.

Similarly, the Activation Server 150 is provided with an Activation Server Public Certificate ASPubC, and a corresponding Activation Server private encryption key ASPrivK. The Activation Server Public Certificate ASPubC includes an Activation Server public encryption key ASPubK. Preferably, the Activation Server public encryption key ASPubK and the Activation Server private encryption key ASPrivK comprise an asymmetric encryption key pair. The Activation Server's Public Certificate ASPubC is signed by a Root Certificate Authority.

The Activation process causes the Token Manager 100 to replace the Distribution private encryption key DPrivK with a Token Manager private key THPrivK, and to replace the Distribution Public Certificate DPubC with a Certificate Authority-signed Token Manager digital public certificate THPubC that includes a user public key THPubK corresponding to the private key THPrivK. The Activation process also causes the Activation Server 150 to associate the Token Manager Public Certificate THPubC with the Serial Number 321 of the Token Manager 100, thereby uniquely associating the Token Manager Public Certificate THPubC with the Token Manager 100.

The Activation process is initiated, at step S700, when an un-activated Token Manager 100 (indicated by a Status 322 of "Not Activated") is in the possession of the end-user and is interfaced with the Computer Host 120. At step S702, the Network Client 345 starts a new session of the web browser 400, connects to the Activation Server 150 (typically over a server side SSL/TLS encrypted communication channel) and sends the Serial Number 321 of the Token Manager 100 to the Activation Server 150 for identification purposes.

In response, the Activation Server 150 generates a session token, and may sign the session token using the Activation Server's private encryption key ASPrivK. As used in this description, a session token is an artefact, such as a random session number, that the issuing server uses to identify the current session. As will be apparent to those of ordinary skill, the Activation Server 150 signs the session token by computing a hash of the session token, and encrypting the hash and the session token with the Activation Server's private encryption key ASPrivK. Unless specified otherwise, the act of signing a datum using an encryption key in this description will refer to the act of encrypting the datum and the hash of the datum with the encryption key.

Optionally, the Activation Server 150 may also generate a pseudo-random code, such as a Server One-Time-Password (SOTP) using the One-Time-Password application 533, and sign the server pseudo-random code using the Activation Server's private encryption key ASPrivK.

The Activation Server 150 may then generate an encrypted activation message by encrypting the signed session token (and the signed server pseudo-random code, if generated) with the Distribution Public Certificate DPubC. Preferably, the Activation Server 150 embeds the encrypted activation message and the Activation Server's Public Certificate ASPubC in a browser cookie, and sends the cookie to the web browser 400, at step S704.

At step S706, the Network Client 345 forwards the encrypted activation message and the Activation Server's Public Certificate ASPubC to the Token Manager 100. Upon receipt, the Token Manager 100 validates the Activation Server's Public Certificate ASPubC by verifying that the Activation Server's Public Certificate ASPubC was signed by a Root Certificate Authority. If validated, the Token Manager 100 decrypts the encrypted activation message using the Distribution Private Key DPrivK. Otherwise, an error is generated and the Activation process aborts.

The Token Manager 100 then validates the signed session token using the Activation Server's Public Certificate ASPubC. As will be apparent to those of ordinary skill, the Token Manager 100 validates the secret by decrypting the session token and the hashed session token using the public encryption key included in the Activation Server's Public Certificate ASPubC, computing a hash of the decrypted session token, and comparing the computed hash against the decrypted hash. Unless specified otherwise, the act of validating a signed datum using an encryption key in this description will refer to the act of decrypting the datum and the hashed datum with the encryption key, and computing a hash of the datum, and comparing the computed hash against the decrypted hash.

If the activation message included a signed server pseudo-random code, the signed server pseudo-random code may be validated using the Activation Server's Public Certificate ASPubC. The server pseudo-random code itself may be validated by comparing the server pseudo-random code against an expected value for the pseudo-random code. If the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110. Alternately, if the Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application.

After the activation message has been validated, the Token Manager 100 or the Network Client 345 generates a credential from the Distribution Public Certificate DPubC of the Token Manager 100.

The Token Manager 100 or the Network Client 345 may implement the credential as a digital certificate. To generate the digital certificate, the Token Manager 100 or the Network Client 345 may generate a Session private encryption key SPrivK and a Session public encryption key SPubK, and may generate a Session Certificate SCert from the Session public encryption key SPubK. The Session private encryption-key SPrivK and a Session public encryption key SPubK comprise an asymmetric encryption key pair. The Session Certificate SCert is populated with the Session public encryption key SPubK, the session token that was received from the Activation Server 150, a ValidFrom time/date and a ValidTo time/date, and the distinguished name (DN) of the Distribution Public Certificate DPubC. The ValidFrom and ValidTo time/date provides the Session Certificate SCert with a lifespan that is no longer than the lifespan of the Distribution Public Certificate DPubC of the Token Manager 100.

Optionally, the Token Manager 100 may also generate a pseudo-random code, such as a One-Time-Password (OTP), and incorporate the pseudo-random code into the Session Certificate SCert. If the Token Manager 100 is implemented as a plug-in peripheral or as an internal device to the Computer Host 120, configured to interface with a hardware token 110, and the hardware token 110 includes a Chip Authentication Program application, the pseudo-random code may be generated by the hardware token 110. Alternately, if the Token Manager 100 is implemented as a self-contained plug-in peripheral or a self-contained contactless device where the functionality of the hardware token 110 is embedded in the Token Manager 100, the pseudo-random code may be generated by a suitable application on the Token Manager 100, such as the One-Time-Password application.

The Token Manager 100 or the Network Client 345 then signs the Session Certificate SCert with the Distribution private encryption key DPrivK of the Token Manager 100. Since the Session Certificate SCert is derived from the Distribution Public Certificate DPubC, and the lifespan of the Session Certificate SCert is no longer than the lifespan of the Distribution Public Certificate DPubC, the Session Certificate SCert is a "child" certificate of the Distribution Public Certificate DPubC, and the Distribution Public Certificate DPubC is a "parent" certificate of the Session Certificate SCert.

The Network Client 345 stores the Session Certificate SCert and the Distribution Public Certificate DPubC in the Certificate Store 405, and stores the Session Private Key SPrivK in the Key Store 410. Since the Session Certificate SCert includes the session token that was received from the Activation Server 150, the Session Certificate SCert is uniquely associated with the Activation Server 150, in the sense that no other Session Certificate SCert signed with the Distribution private encryption key DPrivK would have this session token. Moreover, since the Session Certificate SCert is signed with the Distribution private encryption key DPrivK of the Token Manager 100, the Session Certificate SCert is uniquely associated with the Token Manager 100 in the sense that no other Token Manager 100 could have generated this Session Certificate SCert.

Alternately, instead of implementing the credential as a digital certificate, the Token Manager 100 may implement the credential as a pseudo-random code, such as a One-Time-Password (OTP). Preferably, the credential also includes the session token. As mentioned, if the Token Manager 100 is implemented as a self-contained plug-in peripheral or a self-contained contactless device where the functionality of the hardware token 110 is embedded in the Token Manager 100, the pseudo-random code may be generated by a suitable application on the Token Manager 100, such as the One-Time-Password application. The Token Manager 100 or the Network Client 345 may sign the pseudo-random code (and optionally the session token) with the Distribution private encryption key DPrivK of the Token Manager 100. Since the Session Certificate SCert is signed with the Distribution private encryption key DPrivK of the Token Manager 100, the pseudo-random code is uniquely associated with the Token Manager 100 in the sense that no other Token Manager 100 could have generated this pseudo-random code.

The Network Client 345 then uses the browser 400 to transmit the credential and the Distribution Public Certificate DPubC to the Activation Server 150, at step S708. The Activation Server 150 verifies that the Distribution Public Certificate DPubC was signed by the Root Certificate Authority and, if verified, validates the credential using the Distribution Public Certificate DPubC. As will be apparent to those of ordinary skill, the Activation Server 150 validates the credential by verifying the credential was signed with the Distribution private key DPrivK, and thereby verifies that the credential was generated from the Distribution Public Certificate DPubC. To do so, the Activation Server 150 decrypts the credential and the hashed credential with the Distribution public encryption key DPubK of the Distribution Public Certificate DPubC, computes a hash of the credential, and compares the computed hash against the decrypted hash. Unless specified otherwise, the act of validating a credential using a digital public certificate in this description will refer to the act of verifying that the credential was signed with the private encryption key that is associated with the public encryption key of the digital public certificate. If the credential included the session token, the Activation Server 150 may also validate the credential by verifying that the session token included in the credential matches the session token transmitted by the Activation Server 150, thereby verifying that the credential is associated with the Activation Server 150. If the credential included a pseudo-random code (whether transmitted as part of the Session Certificate SCert, or without any Session Certificate SCert), the Activation Server 150 may also validate the credential by comparing the pseudo-random code against an expected value for the pseudo-random code.

After the Activation Server 150 successfully validates the credential, the Activation Server 150 establishes a new communications session with the browser 400. Preferably, the browser 400 and the Activation Server 150 establish an encrypted session, using Activation Server's Public Certificate ASPubC, in the conventional manner. More preferably, the browser 400 and the Activation Server 150 establish a mutually-authenticated encrypted TLS session. If the credential comprised the Session Certificate SCert, preferably the browser 400 and the Activation Server 150 establish the mutually authenticated TLS session using the Session Certificate SCert and the Activation Server's Public Certificate ASPubC. If the credential comprised the pseudo-random code instead of the Session Certificate SCert, the Network Client 345 may provide the Activation Server 150 with a public certificate of the Token Manager 100, such as the Distribution public certificate DPubC, to facilitate establishment of the mutually authenticated session. Further, preferably the Token Manager 100 and the Activation Server 150 establish an encrypted session, such as a GlobalPlatform Secure Channel Protocol (SCP) session, within the TLS session, to thereby encrypt communications between the Token Manager 100 and the Activation Server 150.

If the browser 400 and the Activation Server 150 are unable to establish a session, an error is generated and the Activation process aborts. However, if the session is successfully established, the Token Manager 100 generates a new private key THPrivK and a corresponding public key THPubK, and stores the private key THPrivK and the public key THPubK respectively in the Private Key store 332 and the Certificate store 333. The private key THPrivK and the public key THPubK comprise an asymmetric encryption key pair.

The Token Manager 100 or the Network Client 345 generates a Certificate Signing Request CSR for the creation of a Token Manager's Public Certificate THPubC based on the Public Key THPubK of the Token Manager 100. The Token Certificate Signing Request CSR includes the Public Key THPubK. The Token Manager 100 or the Network Client 345 also signs the CSR and the Token Manager Serial Number 321 with the Distribution private key DPrivK. Preferably, the Token Manager 100 or the Network Client 345 then generates an encrypted activation message by encrypting the signed CSR and the Serial Number 321 with the Activation Server's Public Certificate ASPubC.

At step S710, the Network Client 345 uses the browser 400 to transmit the encrypted activation message to the Activation Server 150. The Activation Server 150 decrypts the encrypted activation message using the Activation Server's Private Key ASPrivK, and validates the signed CSR and Serial Number 321 using the Distribution Public Certificate DPubC. After the Activation Server 150 has validated the signed CSR and Serial Number 321, the Activation Server 150 determines whether the received Token Manager Serial Number 321 is valid by querying the Activation Database 535 for the Serial Number 321.

If the Token Manager Serial Number 321 is invalid, an error is raised and the Activation process aborts. Otherwise, at step S712, the Activation Server 150 transmits the CSR to the Certificate Authority 170 for signing. The Certificate Authority 170 signs the CSR, and returns the resulting Certificate Authority-signed Public Certificate THPubC, together with the Certificate Authority's Public Certificate THCAPubC, to the Activation Server 150 at step S714. The Activation Server 150 stores the Token Manager's Public Certificate THPubC in the Activation Database 535, together with the Token Manager Serial Number 321.

The Activation Server 150 signs the Token Manager's Public Certificate THPubC and the Certificate Authority's Public Certificate THCAPubC with the Activation Server's Private Key ASPrivK. The Activation Server 150 then uses the Distribution Public Certificate DPubC to encrypt the signed Token Manager's Public Certificate THPubC and Certificate Authority's Public Certificate THCAPubC. At step S716, the Activation Server 150 transmits the encrypted message to the Network Client 345, together with the Activation Server's Public Certificate ASPubC.

The Token Manager 100 or the Network Client 345 decrypts the encrypted message using the Distribution Private Key DPrivK, and verifies that the Activation Server's Public Certificate ASPubC was signed by the Root Certificate Authority. If verified, the Token Manager 100 or the Network Client 345 validates the Token Manager's Public Certificate THPubC and the Certificate Authority's Public Certificate THCAPubC using the Activation Server's Public Certificate ASPubC.

If the Token Manager's Public Certificate THPubC and the Certificate Authority's Public Certificate THCAPubC are validated, the Token Manager 100 or the Network Client 345 verifies that the Certificate Authority's Public Certificate THCAPubC was signed by the Root Certificate Authority. If verified, the Token Manager 100 or the Network Client 345 uses the Certificate Authority's Public Certificate THCAPubC to verify that the Token Manager's Public Certificate THPubC was signed by the Certificate Authority 170. If the signature on the Token Manager's Public Certificate THPubC is invalid, an error is raised and the Activation process aborts. Otherwise, the Token Manager 100 saves the Token Manager's Public Certificate THPubC, in the Certificate Database 333, in replacement of the Distribution Public Certificate DPubC. The Token Manager 100 then updates the Token Status 322 to "Activated".

The Token Manager 100 or Network Client 345 then generates a Successful Update Notification message, signs the Successful Update Notification message with the Token Manager's Private Key THPrivK, encrypts the signed message with the Activation Server's Public Certificate ASPubC, and transmits the encrypted message to the Activation Server 150, at step S718. The Activation Server 150 decrypts the encrypted message with the Activation Server's Private Key ASPrivK, and then verifies the signature on the Successful Update Notification message using the Token Manager's Public Certificate THPubC.

In response, the Activation Server 150 generates a Received Successful Update Notification message, signs the Received Successful Update Notification message with the Activation Server's Private Key ASPrivK, encrypts the signed message with the Token Manager's Public Certificate THPubC, and transmits the encrypted message to the Network Client 345. The Token Manager 100 or the Network Client 345 decrypts the encrypted message with the Token Manager Private Key THPrivK, and verifies the signature on the Received Successful Update Notification message using the Activation Server's Public Certificate ASPubC. The Activation Process ends upon successful verification of the Received Successful Update Notification message.

If the Token Manager 100 is implemented either as a plug-in peripheral or as an internal device to the Computer Host 120, configured to interface with a hardware token 110, one or more of the foregoing steps of the Token Manager 100 may be performed by the hardware token 110.

Token Manager Registration (Embodiment #1)

Figure 6A:
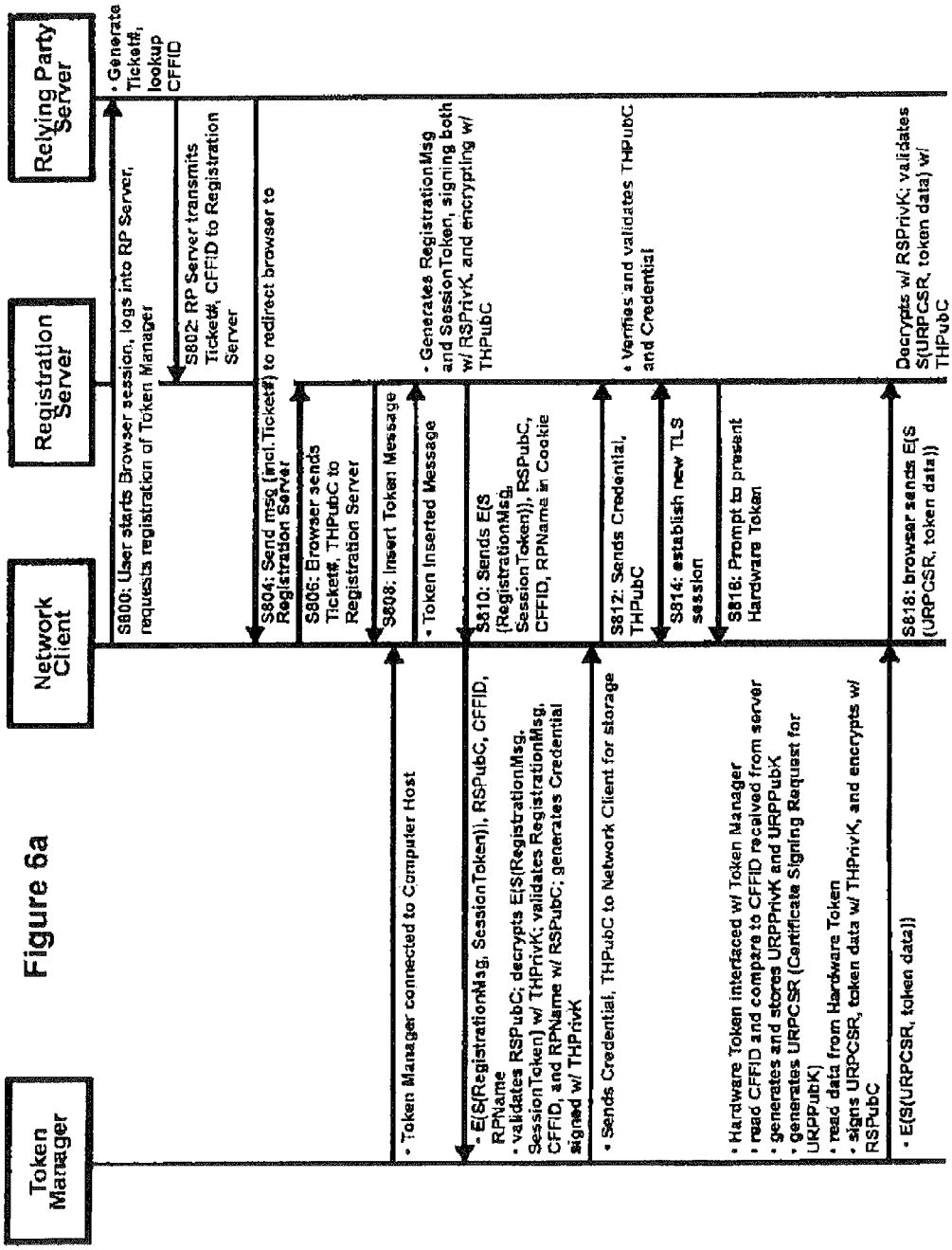
FIGS. 6a and 6b together comprise a message flow diagram that depicts the transmission of messages during a Registration process implemented by the first embodiment of the Token Manager.
Figure 6B:
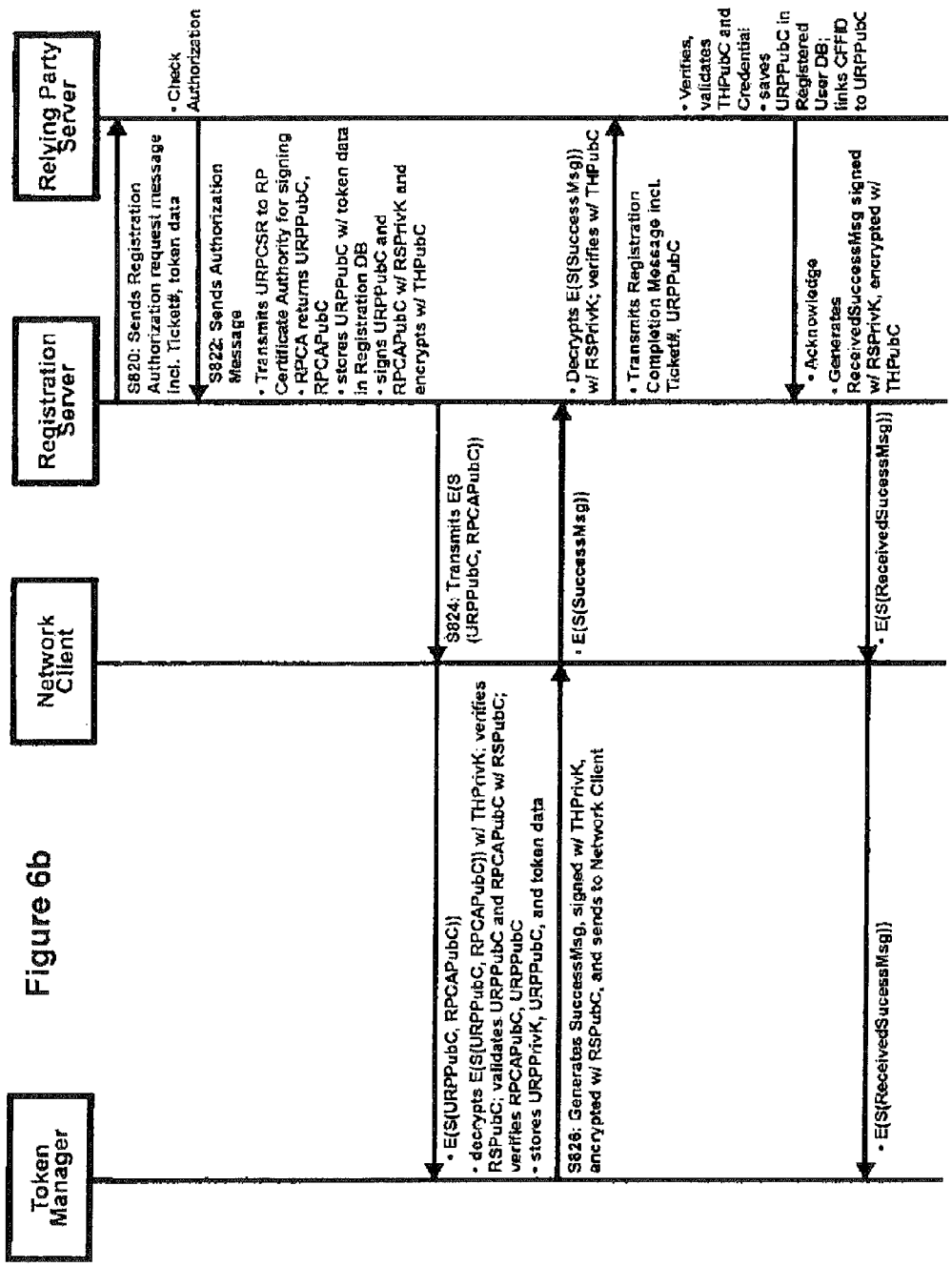

The Registration process that is implemented by the first embodiment of the Token Manager 100 will now be described with reference to FIGS. 6a and 6b. In this embodiment, the Token Manager 100 includes a Token Manager Public Certificate THPubC, and a corresponding private encryption key THPrivK, both of which may have been installed on the Token Manager 100 during the Activation process. Preferably, the Token Manager Public Certificate THPubC is uniquely associated with the Token Manager 100. The Token Manager Public Certificate THPubC includes a Token Manager public encryption key THPubK. Preferably, the Token Manager public encryption key THPubK and the Token Manager private encryption key THPrivK comprise an asymmetric encryption key pair. The Activation Server 150 has a copy of the Token Manager Public Certificate THPubC, and the Serial Number 321 of the associated Token Manager 100.

Similarly, the Relying Party Server 140 is provided with a Relying Party Server Public Certificate RSPubC, and a corresponding Relying Party Server private encryption key RSPrivK. The Relying Party Server Public Certificate RSPubC includes a Relying Party Server public encryption key RSPubK. Preferably, the Relying Party Server public encryption key RSPubK and the Relying Party Server private encryption key RSPrivK comprise an asymmetric encryption key pair. The Relying Party Server's Public Certificate RSPubC is signed by a Root Certificate Authority.

The Registration process causes the Token Manager 100 to be provided with a User private encryption key URPPrivK and a Certificate Authority-signed User digital public certificate URPPubC that includes a User public encryption key URPPubK corresponding to the User private encryption key URPPrivK. The Registration process also causes the Relying Party Server 140 to be provided with a copy of the Certificate Authority-signed User public certificate URPPubC, and to associate the User public certificate URPPubC with a hardware token 110 provided or trusted by the Relying Party. As will be explained, the Token Manager 100 uses the User public certificate URPPubC to register the Token Manager 100 for use with a Relying Party Server 140.

In this first embodiment, the Registration process causes the Token Manager 100 to be provided with a respective User public certificate URPPubC for each Relying Party Server 140, and to register each User public certificate URPPubC with a respective Relying Party Server 140, such that each User public certificate URPPubC is uniquely associated with the Token Manager 100 and a respective Relying Party Server 140.

The Registration Process is initiated, at step S800, when a user starts a new session of the web browser 400, successfully logs in to a Relying Party Server 140 (typically over a server side SSL/TLS encrypted communication channel), and requests Registration of the Token Manager 100. In response, the Relying Party Server 140 queries backend systems with the user's User-ID for a set of identifying data that is associated with and identifies the authenticator(s) (e.g. Token Manager 100, hardware token 110) that have been assigned to the user. The backend systems know the relationship between each user's User-ID and the identifying data (CFFID) of each of the user's authenticators since the authenticators were either issued to the user by the Relying Party, or were issued to the user by another Relying Party and the backend systems were made aware of the relationship.

Preferably, the Token Manager 100 is implemented as a plug-in peripheral or as an internal device to the Computer Host 120, configured to interface with a hardware token 110, the authenticator comprises a hardware token 110, and the CFFID is associated with that hardware token 110. However, if the Token Manager 100 is implemented as a self-contained plug-in peripheral or a self-contained contactless device where the functionality of the hardware token 110 is embedded in the Token Manager 100, the authenticator comprises the Token Manager 100, and the CFFID is associated with the Token Manager 100.

Typically, the CFFID is uniquely associated with the authenticator, such as a unique identification code or a serial number of the hardware token 110 or the Token Manager 100. However, the CFFID need not be uniquely associated with the authenticator, but may instead identify a group or class type of the authenticator. By way of example, the CFFID might indicate that the hardware token 110 required to effect registration must be a banking card. Other hardware tokens are contemplated herein, including credit card, loyalty card, building access pass, driver's licence, health card, and passport. Preferably, the CFFID does not disclose sensitive information about the user, such as the user's bank account number, credit card number, driver's licence number, or other data that could be used to impersonate the user.

After the Relying Party Server 140 has acquired the CFFID of the authenticator that is required to effect registration, the Relying Party Server 140 generates a random Registration Ticket number, and associates the CFFID with the Registration Ticket number. At step S802, the Relying Party Server 140 then transmits a registration message to the Registration Server 160, over a secure channel, which includes the CFFID and the assigned Registration Ticket number. At step S804, the Relying Party Server 140 issues to the browser 400 a redirection message that includes the Registration Ticket number, and redirects the browser 400 to the Registration Server 160.

The browser 400 connects to the Registration Server 160 (typically over a server side SSL/TLS encrypted communication channel) at step S806, and provides the Registration Server 160 with the received Registration Ticket number and the Token Manager's Public Certificate THPubC for identification purposes. At step S808, the Registration Server 160 causes the computer browser 400 to display a message instructing the user to physically interface the Token Manager 100 with the Computer Host 120 (unless the Token Manager 100 is implemented as an internal device to the Computer Host 120).

After the Token Manager 100 is physically interfaced with the Computer Host 120, the Registration Server 160 generates a registration message RegistrationMsg, and a session token, such as a random session number, and may sign the registration message RegistrationMsg and the session token using the Registration Server's private encryption key RSPrivK. Optionally, the Registration Server 160 may also generate a pseudo-random code, such as a Server One-Time-Password (SOTP) using the One-Time-Password application 543, and sign the server pseudo-random code using the Registration Server's private encryption key RSPrivK.

The Registration Server 160 may then encrypt the signed registration message RegistrationMsg and the signed session token (and the signed server pseudo-random code, if generated) with the Token Manager's Public Certificate THPubC. Preferably, the Registration Server 160 embeds the encrypted data and the Registration Server's Public Certificate RSPubC in a browser cookie, and sends the cookie to the browser 400, at step S810.

The Network Client 345 forwards the encrypted data and the Registration Server's Public Certificate RSPubC to the Token Manager 100. Upon receipt, the Token Manager 100 or the Network Client 345 validates the Registration Server's Public Certificate RSPubC by verifying that the Registration Server's Public Certificate RSPubC was signed by a Root Certificate Authority. If validated, the Token Manager 100 decrypts the data using the Token Manager's private key THPrivK; otherwise, an error is generated and the Registration process aborts. The Token Manager 100 then validates the signed RegistrationMsg, CFFID, and the distinguished name (DN) using the Registration Server's Public Certificate RSPubC.

If a signed server pseudo-random code was transmitted with the registration message RegistrationMsg, the signed server pseudo-random code may be validated using the Registration Server's Public Certificate RSPubC. The server pseudo-random code itself may be validated by comparing the server pseudo-random code against an expected value for the pseudo-random code. If the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110. Alternately, if the Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application.

After the RegistrationMsg, CFFID, and DN have been validated, the Token Manager 100 or the Network Client 345 generates a credential from the Token Manager Public Certificate THPubC.

The Token Manager 100 or the Network Client 345 may implement the credential as a digital certificate. To generate the digital certificate, the Token Manager 100 or the Network Client 345 may generate a Session private encryption key SPrivK and a Session public encryption key SPubK, and may generate a Session Certificate SCert from the Session public encryption key SPubK. The Session private encryption key SPrivK and a Session public encryption key SPubK comprise an asymmetric encryption key pair. The Session Certificate SCert is populated with the Session public encryption key SPubK, the session token that was received from the Registration Server 160, a ValidFrom time/date and a ValidTo time/date, and the distinguished name (DN) of the Token Manager Public Certificate THPubC. The ValidFrom and ValidTo time/date provides the Session Certificate SCert with a lifespan that is no longer than the lifespan of the Token Manager Public Certificate THPubC.

Optionally, the Token Manager 100 may also generate a pseudo-random code, such as a One-Time-Password (OTP), and incorporate the pseudo-random code into the Session Certificate SCert. The pseudo-random code may be generated by a suitable application on the Token Manager 100, such as the One-Time-Password application.

The Token Manager 100 or the Network Client 345 then signs the Session Certificate SCert with the Token Manager private encryption key THPrivK. Since the Session Certificate SCert is derived from the Token Manager Public Certificate THPubC, and the lifespan of the Session Certificate SCert is no longer than the lifespan of the Token Manager Public Certificate THPubC, the Session Certificate SCert is a "child" certificate of the Token Manager Public Certificate THPubC, and the Token Manager Public Certificate THPubC is a "parent" certificate of the Session Certificate SCert.

The Network Client 345 stores the Session Certificate SCert and the Token Manager Public Certificate THPubC in the Certificate Store 405, and stores the Session Private Key SPrivK in the Key Store 410. Since the Session Certificate SCert includes the session token that was received from the Registration Server 160, the Session Certificate SCert is uniquely associated with the Registration Server 160, in the sense that no other Session Certificate SCert signed with the Token Manager private encryption key THPrivK would have this session token. Moreover, since the Session Certificate SCert is signed with the Token Manager private encryption key THPrivK, the Session Certificate SCert is uniquely associated with the Token Manager 100 in the sense that no other Token Manager 100 could have generated this Session Certificate SCert. Therefore, this Session Certificate SCert is uniquely associated with the Token Manager 100 and the Registration Server 160, in the sense that this Session Certificate SCert is only associated with this combination of Token Manager 100 and Registration Server 160.

Alternately, instead of implementing the credential as a digital certificate, the Token Manager 100 may implement the credential as a pseudo-random code, such as a One-Time-Password (OTP), using a suitable application on the Token Manager 100, such as the One-Time-Password application. Preferably, the credential also includes the session token. The Token Manager 100 or the Network Client 345 may sign the pseudo-random code (and optionally the session token) with the Token Manager private encryption key THPrivK. Since the pseudo-random code is signed with the Token Manager private encryption key THPrivK, the pseudo-random code is uniquely associated with the Token Manager 100 in the sense that no other Token Manager 100 could have generated this pseudo-random code.

The Network Client 345 then uses the browser 400 to transmit the credential and the Token Manager Public Certificate THPubC to the Registration Server 160, at step S812. The Registration Server 160 verifies that the Token Manager Public Certificate THPubC was signed by the Root Certificate Authority and, if verified, validates the credential using the Token Manager Public Certificate THPubC, thereby verifying that the credential was generated from the Token Manager Public Certificate THPubC. If the credential included the session token, the Registration Server 160 may also validate the credential by verifying that the session token included in the credential matches the session token transmitted by the Registration Server 160, thereby verifying that the credential is uniquely associated with the Registration Server 160. If the credential included a pseudo-random code (whether transmitted as part of the Session Certificate SCert, or without any Session Certificate SCert), the Registration Server 160 may also validate the credential by comparing the pseudo-random code against an expected value for the pseudo-random code.

After the Registration Server 160 successfully validates the credential, at step S814 the Registration Server 160 establishes a new communication session with the browser 400. Preferably, the browser 400 and the Registration Server 160 establish an encrypted session, using Registration Server's Public Certificate RSPubC, in the conventional manner. More preferably, the browser 400 and the Registration Server 160 establish a mutually-authenticated encrypted TLS session. If the credential comprised the Session Certificate SCert, preferably the browser 400 and the Registration Server 160 establish the mutually authenticated TLS session using the Session Certificate SCert and the Registration Server's Public Certificate RSPubC. If the credential comprised the pseudo-random code instead of the Session Certificate SCert, the Network Client 345 may provide the Registration Server 160 with a public certificate of the Token Manager 100, such as the Token Manager public certificate THPubC, to facilitate establishment of the mutually authenticated session. Further, preferably the Token Manager 100 and the Registration Server 160 establish an encrypted session, such as a GlobalPlatform Secure Channel Protocol (SCP) session, within the TLS session, to thereby encrypt communications between the Token Manager 100 and the Registration Server 160.

If the browser 400 and the Registration Server 160 are unable to establish a session, an error is generated and the Registration process aborts. However, if the session is successfully established, at step S816 the Registration Server 160 causes the browser 400 to display a message instructing the user to physically interface an authenticator with the Computer Host 120. In response, typically the user will interface a hardware token 110 with the Token Manager 100 (unless the Token Manager 100 is implemented as a self-contained plug-in peripheral or a self-contained contactless device where the functionality of the hardware token 110 is embedded in the Token Manager 100).

After the hardware token 110 is physically interfaced with the Token Manager 100 (if required), the Token Manager 100 or the Network Client 345 may validate data originating from the hardware token 110. To do so, the Token Manager 100 may read identifying data from the hardware token 110, and the Token Manager 100 or the Network Client 345 may determine whether the identifying data that was read from the hardware token 110 matches any one of the received CFFIDs required by the Relying Party Server 140 (transmitted to the Token Manager 100 by the Registration Server 160). Alternately, if the Token Manager 100 is implemented as a self-contained plug-in peripheral or a self-contained contactless device where the functionality of the hardware token 110 is embedded in the Token Manager 100, the Token Manager 100 or Network Client 345 may determine whether the identifying data that was read from the Token Manager 100 (such as the Token Manager Serial Number 321) matches the received CFFID.

If the CFFID reveals that that the identifying data that originated from the hardware token 110 (or the Token Manager 100) is not valid, an error is raised and the Registration process ends. However, if the CFFID reveals that the identifying data that originated from the hardware token 110 (or the Token Manager 100) is valid, the Token Manager 100 generates a new User-Relying Party Private Key URPPrivK and a corresponding User-Relying Party Public Key URPPubK, and stores the private key URPPrivK and the public key URPPubK respectively in the Private Key store 332 and the Certificate store 333. The User-Relying Party private key URPPrivK and the User-Relying Party public key URPPubK comprise an asymmetric encryption key pair. As explained, in this embodiment, the Token Manager 100 generates a unique URPPrivK/URPPubK key pair for each Relying Party Server 140 with which the user requires to use the Token Manager 100. Therefore, the User-Relying Party Private Key URPPrivK and the corresponding User-Relying Party Public Key URPPubK are uniquely associated with the Token Manager 100 and the Relying Party Server 140.

The Token Manager 100 or the Network Client 345 generates a User-Relying Party Certificate Signing Request URPCSR for the creation of a User-RP Public Certificate URPPubC based on the User-Relying Party Public Key URP- PubK. The User-Relying Party Certificate Signing Request URPCSR includes the User-Relying Party Public Key URPPubK. The Token Manager 100 or the Network Client 345 also signs the URPCSR, the Token Manager Serial Number 321 and the identifying data read from the hardware token 110 (or the Token Manager 100) with the Token Manager private key THPrivK.

Optionally, the Token Manager 100 may request token presence data from the hardware token 110, and sign the token presence data with the Token Manager private key THPrivK. As will be explained, typically the token presence data is different from the identifying data, and is used by the Relying Party Server 140 to confirm that the hardware token 110 was physically presented to the Token Manager 100 during the Registration process. The token presence data may comprise a token pseudo-random code, such as a Token OneTime Password (TOTP), or a static secret, and may be generated by a Chip Authentication Program application on the hardware token 110. Alternately, the token presence data may comprise dynamically-generated data.

If the hardware token 110 is configured as an EMV payment card, the dynamically-generated data may comprise a cryptogram, that is generated from data originating from the hardware token 110. To compute the cryptogram, the Token Manager 100 may send a random number to the hardware token 110, and the hardware token 110 generates the cryptogram from the random number, an internal card counter number and a diversified key, such as a triple-DES (Data Encryption Standard) key, of the hardware token 110. The hardware token 110 may then send the cryptogram to the Token Manager 100.

If the hardware token 110 is configured as a magnetic stripe card, the dynamically-generated data token may comprise a dynamic Card Verification Value (CVV) that is generated from data originating from the hardware token 110. To compute the dynamic CVV, the Token Manager 100 may send a random number to the hardware token 110, and the hardware token 110 generates the dynamic CVV from the random number, an internal card counter number and a diversified key of the hardware token 110. The hardware token 110 may then send the dynamic CVV to the Token Manager 100, either as part of the hardware token's Track 2 discretionary data, or independently of any Track 2 discretionary data.

Preferably, the Token Manager 100 or the Network Client 345 then generates an encrypted registration message by encrypting the signed URPCSR, signed Token Manager Serial Number 321 and signed identifying data (and, if generated, the token presence data, random number and internal card counter) with the Registration Server's Public Certificate RSPubC.

At step S818, the Network Client 345 uses the browser 400 to transmit the encrypted registration message to the Registration Server 160. The Registration Server 160 decrypts the encrypted registration message using the Registration Server's Private Key RSPrivK, and validates the signed URPCSR, signed Serial Number 321 and signed identifying data using the Token Manager's Public Certificate THPubC. After the Registration Server 160 has validated this data, at step S820 the Registration Server 160 transmits to the Relying Party Server 140, over a secure channel, a Registration Authorization request message that includes the Registration Ticket number (previously transmitted by the browser 400 to the Registration Server 160 at step S806) and the identifying data (and, if generated, the token presence data, random number and internal card counter).

In the variation where the hardware token 110 generated token presence data, the Relying Party Server 140 may validate the token presence data by comparing the token presence data against an expected value for the token presence data. This latter step allows the Relying Party Server 140 to verify that the hardware token 110 was actually presented during the Registration process. As will be apparent, if the token presence data comprises a token pseudo-random code or a static secret, the Relying Party Server 140 validates the credential by comparing the token pseudo-random code against an expected value. If the token presence data comprises dynamically-generated data, the Relying Party Server 140 typically already has a copy of the diversified key of the hardware token 110, and validates the credential by generating a reference value from the random number, the internal card counter number and the diversified key, and comparing the generated reference value against the received dynamically-generated data.

Alternatively, the Relying Party Server 140 or the Token Manager 100 may provide a random datum, such as an unpredictable number, to the hardware token 110, and the hardware token 110 may generate dynamic data by signing the random datum with its private key (or diversified key), and send the signed datum to the Relying Party Server 140. The Relying Party Server 140 could then decrypt the encrypted dynamic data, and validate the signed data to confirm presence of the hardware token 110.

If the token presence data cannot be validated, or if the Relying Party Server 140 did not associate the Registration Ticket number with the identifying data (at step S800), an error is raised and the Registration process aborts. Otherwise, at step S822, the Relying Party Server 140 issues the Registration Server 160 an authorization message, whereupon the Registration Server 160 transmits the User-Relying Party Certificate Signing Request URPCSR to the Certificate Authority 170 for signing. The Certificate Authority 170 signs the URPCSR, and returns the resulting Certificate Authority-signed User-RP Public Certificate URPPubC, together with the Certificate Authority's Public Certificate RPCAPubC, to the Registration Server 160. The Registration Server 160 stores the User-RP Public Certificate URPPubC, together with the Token Manager Serial Number 321, in the Registration Database 545. As will become apparent, the User-RP Public Certificate URPPubC serves as an authentication payload that facilitates authentication of the Network Client 345 to the Relying Party Server 140.

The Registration Server 160 signs the authentication payload and the Certificate Authority's Public Certificate RPCAPubC with the Registration Server's Private Key RSPrivK. The Registration Server 160 then generates an encrypted message by encrypting the signed authentication payload and the signed Certificate Authority's Public Certificate RPCAPubC using the Token Manager Public Certificate THPubC. At step S824, the Registration Server 160 transmits the encrypted message to the Network Client 345. As will be apparent, the encrypted message (including the authentication payload) is transmitted to the Network Client 345, at step S824, only if the credential and the identifying data (and optionally the presence data, if generated) were determined to be valid.

The Token Manager 100 or the Network Client 345 decrypts the encrypted message using the Token Manager Private Key THPrivK, and verifies that the Registration Server's Public Certificate RSPubC was signed by the Root Certificate Authority. If verified, the Token Manager 100 or the Network Client 345 validates the signed User-RP Public Certificate URPPubC and the signed Certificate Authority's Public Certificate RPCAPubC using the Registration Server's Public Certificate RSPubC.

If the User-RP Public Certificate URPPubC and the Certificate Authority's Public Certificate RPCAPubC are validated, the Token Manager 100 or the Network Client 345 verifies that Certificate Authority's Public Certificate RPCAPubC was signed by the Root Certificate Authority 170. If verified, the Token Manager 100 or the Network Client 345 uses the Certificate Authority's Public Certificate RPCAPubC to verify that the User-RP Public Certificate URPPubC was signed by the Certificate Authority 170. If the signature on the User-RP Public Certificate URPPubC is invalid, an error is raised and the Registration process aborts. Otherwise, the Token Manager 100 saves the User-Relying Party Private Key URPPrivK in the User RP Private Key store 326, saves the User-RP Public Certificate URPPubC in the User Certificate store 327, saves the identifying data in the Form Factor Details store 329, and links the identifying data to the User Relying Party Private Key URPPrivK and the User-RP Public Certificate URPPubC. Since the User-Relying Party Private Key URPPrivK and the corresponding User-Relying Party Public Key URPPubK are uniquely associated with the Token Manager 100 and the Relying Party Server 140, the User-RP Public Certificate URPPubC is uniquely associated with the Token Manager 100 and the Relying Party Server 140.

Alternately, instead of the Token Manager 100 generating a new User-Relying Party Private Key URPPrivK and a corresponding User-Relying Party Public Key URPPubK, and transmitting a new User-Relying Party Certificate Signing Request URPCSR to the Registration Server 160 at step S818, the Token Manager 100 may provide the Registration Server 160 with a User-RP Public Certificate URPPubC that was generated for an entity other than the Relying Party. For example, as discussed above, the CFFID required by the Relying Party may specify one or more particular group or class types of hardware tokens 110. This variation, which allows a Relying Party Server 140 to trust the User-RP Public Certificate URPPubC that was issued for an entity other than the Relying Party, simplifies the Registration process for a Relying Party that does not issue its own hardware tokens 110, and also reduces the number of User-RP Public Certificates URPPubC that must be stored on the memory-constrained Token Manager 100.

At step S826, the Token Manager 100 of the Network Client 345 then generates a Successful Update Notification message, signs the Successful Update Notification message with the Token Manager Private Key THPrivK, encrypts the signed message with the Registration Server's Public Certificate RSPubC, and transmits the encrypted message to the Registration Server 160. The Registration Server 160 decrypts the encrypted message with the Registration Server's Private Key RSPrivK, and then verifies the signature on the Successful Update Notification message using the Token Manager's Public Certificate THPubC.

In response, the Registration Server 160 transmits to the Relying Party Server 140, over a secure channel, a Registration Completion message that includes the Registration Ticket number and the User-RP Public Certificate URPPubC. Optionally, the Registration Completion message also includes the Token Manager Serial Number 321. The Relying Party Server 140 saves the User-RP Public Certificate URPPubC in the Registered User Database 520, and links the CFFID (and optionally the Serial Number 321) to the User-RP Public Certificate URPPubC via the User-ID. The Relying Party Server 140 also updates the Registered User Database 520 with the user's User-ID, to indicate that the user has registered the associated Token Manager 100 with the Relying Party.

As discussed above, typically the CFFID is uniquely associated with the authenticator. However, the CFFID may identify a group or class type of authenticator. Therefore, each User-RP Public Certificate URPPubC may be uniquely associated with a Token Manager 100 or an hardware token 110, or may be associated with a group or class type of Token Managers 100 or hardware tokens 110.

The Registration Server 160 then generates a Received Successful Update Notification message, signs the Received Successful Update Notification message with the Registration Server's Private Key RSPrivK, encrypts the signed message with the Token Manager's Public Certificate THPubC, and transmits the encrypted message to the Network Client 345. The Token Manager 100 or the Network Client 345 decrypts the encrypted message with the Token Manager Private Key THPrivK, and then verifies the signature on the Received Successful Update Notification message using the Registration Server's Public Certificate RSPubC. The Registration Process ends upon successful verification of the Received Successful Update Notification message. At step S828, the Registration Server 160 redirects the browser 400 back to the Relying Party Server 140.

If the Token Manager 100 is implemented either as a plug-in peripheral or as an internal device to the Computer Host 120, configured to interface with a hardware token 110, one or more of the foregoing steps of the Token Manager 100 may be performed by the hardware token 110.

More complex rules to validate the hardware tokens 110 could be implemented. For example, the Relying Party Server 140 may transmit a request to the Registration Server 160 asking the Registration Server 160 to specify other Relying Parties with which the hardware token 110 has been used for registration. In response, the Registration Server 160 might transmit a request to other Relying Party Web Servers 140 to determine if the most recent Authentication requests for that hardware token 110 were successful or not. Based on whether the hardware token 110 had been registered at another Relying Party and had been successfully used far accessing that other Relying Party, the hardware token 110 would be deemed validated.

Token Manager Authentication (Embodiment #1)

The Authentication process that is implemented by the first embodiment of the Token Manager 100 will now be described with reference to FIG. 7. In this embodiment, the Token Manager 100 includes a one or more User public certificates URPPubC, and corresponding private encryption keys URPPrivK, which were installed on the Token Manager 100 during the Registration process. Each User public certificate URPPubC includes a User public encryption key URPPubK. Preferably, the User public encryption key URPPubK and the User private encryption key URPPrivK comprise an asymmetric encryption key pair.

Typically, each User public certificate URPPubC is uniquely associated with one of the Token Managers 100 and one of the Relying Party Servers 140; however, in one variation, a User public certificate URPPubC may be uniquely associated with one of the Token Managers 100 while also being associated with multiple Relying Party Servers 140. Further, typically each User public certificate URPPubC is uniquely associated with one hardware token 110; however, in one variation, a User public certificate URPPubC may be associated with multiple hardware tokens 110. Each Relying Party Server 140 has a copy of the associated User public certificate URPPubC, and maintains a link between the User public certificate URPPubC, the User-ID, and the CFFID of the associated hardware token 110 (and optionally the Token Manager Serial Number 321).

The Authentication process causes the Token Manager 100 to authenticate itself to one of the Relying Party Servers 140, by providing the Relying Party Server 140 with a credential that is generated from the User public certificate URPPubC that was registered with the Relying Party Server 140. Preferably, the user presents a hardware token 110 to the Token Manager 100, and the Token Manager 100 may release the credential to the Relying Party Server 140 upon successfully verifying that the same hardware token 110 (or a hardware token 110 of the same group or class type) was presented to the Token Manager 100 during the Registration of the User public certificate URPPubC.

The Authentication process also causes the Relying Party 140 to verify that the credential was generated from a User public certificate URPPubC that was registered with the Relying Party Server 140. As a result, verification of the credential allows the Relying Party Server 140 to verify that an authentic Token Manager 100 was used during the Authentication process. The credential may include data originating from the hardware token 110. The Authentication process may also cause the Relying Party Server 140 to validate the data of the hardware token 110, and thereby confirm that the correct hardware token 110 was physically presented to the Token Manager 100 during the Authentication process. The Authentication process may also cause the Relying Party Server 140 to verify that the Token Manager 100 is the same Token Manager as was associated with the hardware token 110 during the Registration process.

The Authentication Process is initiated, at step s900 when the Token Manager 100 is interfaced with the Computer Host 120. The user starts a new session of the web browser 400 at step S902, and logs in to a Relying Party Server 140 (typically over a server side SSL/TLS encrypted communication channel) at step S904 by providing the user's login credentials (for example, the user's User-ID and password).

The Relying Party Server 140 validates the user's login credentials, and then determines whether the user has already registered a Token Manager 100 with the Relying Party Server 140. To do so, the Relying Party Server 140 queries the Registered User Database 520 with the user's User-ID. If the user has not registered a Token Manager 100 with the Relying Party Server 140, the Authentication process ends.

The Relying Party Server 140 then generates a session token, such as a random session number, and associates the session token with the user's User-ID. The Relying Party Server 140 may also generate a random number RN, and may sign the random number RN, the session token (and the CFFID associated with the user's User-ID) with the Relying Party Server's private key WSRPPrivK. Optionally, the Relying Party Server 140 may also generate a pseudo-random code, such as a Server One-Time-Password (SOTP) using the One-Time-Password application 516, and sign the server pseudo-random code using the Relying Party Server's private encryption key WSRPPrivK.

The Relying Party Server 140 may then generate an encrypted authentication message by encrypting the signed random number RN, the signed session token and the signed CFFID (and the signed server pseudo-random code, if generated) with the User-RP Public Certificate URPPubC that was registered with the Relying Party Server 140 during the Registration Process. Preferably, the Relying Party Server 140 embeds the encrypted data and the Relying Party Server's Public Certificate WSRPPubC in a browser cookie, and sends the cookie to the browser 400, at step S906.

The Network Client 345 forwards the encrypted data and the Relying Party Server's Public Certificate WSRPPubC to the Token Manager 100. Upon receipt, the Network Client 345 causes the browser 400 to display a message instructing the user to physically interface an authenticator with the Computer Host 120. In response, typically the user will interface a hardware token 110 with the Token Manager 100 (unless the Token Manager 100 is implemented as a self-contained plug-in peripheral or a self-contained contactless device where the functionality of the hardware token 110 is embedded in the Token Manager 100).

After the hardware token 110 is physically interfaced with the Token Manager 100, the Token Manager 100 may read identifying data from the hardware token 110. Alternately, if the Token Manager 100 is implemented as a self-contained plug-in peripheral or a self-contained contactless device where the functionality of the hardware token 110 is embedded in the Token Manager 100, the Token Manager 100 may read its own identifying data (such as the Serial Number 321). The Token Manager 100 then queries the Form Factor Details store 329 with the identifying data for the User-RP Public Certificate URPPubC that was registered with the Relying Party Server 140.

As discussed above, each User-RP Public Certificate URPPubC may be uniquely associated with a Token Manager 100 and a hardware token 110, or may be associated with a Token Manager 100 and a group or class type of hardware tokens 110. Therefore, depending on the CFFID-User-RP Public Certificate URPPubC association, the user may be required to present the same hardware token 110 that was presented during the Registration process, or may be required to only present a hardware token 110 of the same group or class type as presented during the Registration process.

The Token Manager 100 decrypts the authentication message using the User-RP Public Certificate URPPubC, and then verifies that the Relying Party Server's Public Certificate WSRPPubC was signed by the Root Certificate Authority. If verified, the Token Manager 100 validates the signed random number RN, and the signed CFFID using the Relying Party Server's Public Certificate WSRPPubC.

If the authentication message included a signed server pseudo-random code, the signed server pseudo-random code may be validated using the Relying Party Server's Public Certificate WSRPPubC. The server pseudo-random code itself may be validated by comparing the server pseudo-random code against an expected value for the pseudo-random code. If the Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application. Alternately, if the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110.

The Token Manager 100 or the Network Client 345 may then validate the hardware token 110. To do so, the Token Manager 100 may determine whether the identifying data that was read from the hardware token 110 matches the CFFID that was transmitted to the Token Manager 100 by the Relying Party Server 140. Alternately, if the Token Manager 100 is implemented as a self-contained plug-in peripheral or a self-contained contactless device where the functionality of the hardware token 110 is embedded in the Token Manager 100, the Token Manager 100 may determine whether the identifying data that was read from the Token Manager 100 (such as the Serial Number 321) matches the received CFFID.

If the CFFID reveals that that the hardware token 110 (or the Token Manager 100) is not valid, an error is raised and the Authentication process ends. However, if the CFFID reveals that the hardware token 110 (or the Token Manager 100) is valid, the Token Manager 100 or the Network Client 345 generates a credential from the User-RP Public Certificate URPPubC.

The Token Manager 100 or the Network Client 345 may implement the credential as a digital certificate. To generate the digital certificate, the Token Manager 100 or the Network Client 345 may generate a Session private encryption key SPrivK and a Session public encryption key SPubK, and may generate a Session Certificate SCert from the Session public encryption key SPubK. The Session private encryption key SPrivK and a Session public encryption key SPubK comprise an asymmetric encryption key pair. The Session Certificate SCert is populated with the Session public encryption key SPubK, the session token that was received from the Relying Party Server 140, a ValidFrom time/date and a ValidTo time/date, and the distinguished name (DN) of the User-RP Public Certificate URPPubC. The ValidFrom and ValidTo time/date provides the Session Certificate SCert with a lifespan that is no longer than the lifespan of the User-RP Public Certificate URPPubC.

Optionally, the Token Manager 100 may also generate a pseudo-random code, such as a One-Time-Password (OTP), and incorporate the pseudo-random code into the Session Certificate SCert. The pseudo-random code may be generated by a suitable application on the Token Manager 100, such as the One-Time-Password application.

Optionally (either in addition to or instead of the pseudo-random code of the Token Manager 100), the Token Manager 100 may request token presence data from the hardware token 110, and incorporate the token presence data into the Session Certificate SCert. As will be explained, the Relying Party Server 140 uses the token presence data to confirm that the hardware token 110 was physically presented to the Token Manager 100 during the Authentication process.

The token presence data may comprise a token pseudo-random code, such as a Token One-Time Password (TOTP), or a static secret, and may be generated by a Chip Authentication Program application on the hardware token 110. Alternately, the token presence data may comprise dynamically-generated data.

If the hardware token 110 is configured as an EMV payment card, the dynamically-generated data may comprise a cryptogram, that is generated from data originating from the hardware token 110. To compute the cryptogram, the Token Manager 100 may send a random number to the hardware token 110, and the hardware token 110 generates the cryptogram from the random number, an internal card counter number and a diversified key, such as a triple-DES (Data Encryption Standard) key, of the hardware token 110. The hardware token 110 may then send the cryptogram to the Token Manager 100.

If the hardware token 110 is configured as a magnetic stripe card, the dynamically-generated data token may comprise a dynamic Card Verification Value (CVV) that is generated from data originating from the hardware token 110. To compute the dynamic CVV, the Token Manager 100 may send a random number to the hardware token 110, and the hardware token 110 generates the dynamic CVV from the random number, an internal card counter number and a diversified key of the hardware token 110. The hardware token 110 may then send the dynamic CVV to the Token Manager 100, either as part of the hardware token's Track 2 discretionary data, or independently of any Track 2 discretionary data.

The Token Manager 100 or the Network Client 345 then signs the Session Certificate SCert with the User-Relying Party private key URPPrivK. Since the Session Certificate SCert is derived from the User-Relying Party Public Certificate URPPubC, and the lifespan of the Session Certificate SCert is no longer than the lifespan of the User-RP Public Certificate URPPubC, the Session Certificate SCert is a "child" certificate of the User-RP Public Certificate URPPubC, and the User-RP Public Certificate URPPubC is a "parent" certificate of the Session Certificate SCert.

The Network Client 345 stores the Session Certificate SCert and the User-RP Public Certificate URPPubC in the Certificate Store 405, and stores the Session Private Key SPrivK in the Key Store 410. Since the Session Certificate SCert includes the session token that was received from the Relying Party Server 140, the Session Certificate SCert is uniquely associated with the Relying Party Server 140, in the sense that no other Session Certificate SCert signed with the User-Relying Party private key URPPrivK would have this session token. Moreover, since the Session Certificate SCert is signed with the User-Relying Party private key URPPrivK, the Session Certificate SCert is uniquely associated with the Token Manager 100 in the sense that no other Token Manager 100 could have generated this Session Certificate SCert. Therefore, this Session Certificate SCert is uniquely associated with the Token Manager 100 and the Relying Party Server 140, in the sense that this Session Certificate SCert is only associated with this combination of Token Manager 100 and Relying Party Server 140. Moreover, if the Session Certificate SCert includes token presence data, the Session Certificate SCert is uniquely associated with the hardware token 110, and is also uniquely associated with the hardware token 110, Token Manager 100 and Relying Party Server 140 in the sense that this Session Certificate SCert is only associated with this combination of hardware token 110, Token Manager 100 and Relying Party Server 140.

Alternately, instead of implementing the credential as a digital certificate, the Token Manager 100 may implement the credential as a pseudo-random code, such as a One-Time-Password (OTP). Preferably, the credential also includes the session token. The pseudo-random code may be generated by a suitable application on the Token Manager 100, such as the One-Time-Password application. Optionally (either in addition to or instead of the pseudo-random code of the Token Manager 100), the Token Manager 100 may request token presence data from the hardware token 110, and implement the credential as token presence data (with or without the pseudo-random code of the Token Manager 100). The token presence data may comprise a static secret, or a token pseudo-random code, such as a Token One-Time Password (TOTP), generated by a Chip Authentication Program application on the hardware token 110. Alternately, as discussed above, the token presence data may comprise dynamically-generated data.

The Token Manager 100 or the Network Client 345 may sign the pseudo-random code (and optionally the session token, and, if generated, the token presence data, random number and internal card counter) with the User-Relying Party private key URPPrivK. Since the pseudo-random code and the token presence data is signed with the User-Relying Party private key URPPrivK, the signed pseudo-random code and token presence data is associated with the Token Manager 100. Since the pseudo-random code and token presence data is signed with the User-Relying Party private key URPPrivK, the pseudo-random code and token presence data is uniquely associated with the Token Manager 100 in the sense that no other Token Manager 100 could have generated this signed credential. Moreover, if the User-RP Public Certificate URPPubC is only associated with the Token Manager 100 and the Relying Party Server 140, this pseudo-random code is uniquely associated with the Token Manager 100 and the Relying Party Server 140. Moreover, if the credential includes the token presence data, the credential is uniquely associated with the hardware token 110, and is also uniquely associated with the hardware token 110, Token Manager 100 and Relying Party Server 140 in the sense that this credential is only associated with this combination of hardware token 110, Token Manager 100 and Relying Party Server 140.

The Network Client 345 then uses the browser 400 to transmit the credential and the User-RP Public Certificate URPPubC to the Relying Party Server 140, at step S908. The Relying Party Server 140 then validates the credential. To do so, the Relying Party Server 140 verifies that the User-RP Public Certificate URPPubC was signed by the Root Certificate Authority and, if verified, validates the credential using the User-RP Public Certificate URPPubC, thereby verifying that the credential was generated from the User-RP Public Certificate URPPubC and is uniquely associated with the Token Manager 100 and the Relying Party Server 140. If the credential included the session token, the Relying Party Server 140 may also validate the credential by verifying that the session token included in the credential matches the session token transmitted by the Relying Party Server 140, thereby again verifying that the credential is uniquely associated with the Relying Party Server 140. If the credential included a pseudo-random code or static secret (whether transmitted as part of the Session Certificate SCert, or without any Session Certificate SCert), the Relying Party Server 140 may also validate the credential by comparing the pseudo-random code against an expected value for the pseudo-random code.

Similarly, if the credential included token presence data (whether transmitted as part of the Session Certificate SCert, or without any Session Certificate SCert), the Relying Party Server 140 may also validate the credential by comparing the token presence data against an expected value for the token presence data. This latter step allows the Relying Party to verify that the hardware token 110 that was presented during the Authentication process is the same (or is of the same group or class type) as the hardware token 110 that was presented during the Registration process. As will be apparent, if the token presence data comprises a token pseudo-random code or static secret, the Relying Party Server 140 validates the credential by comparing the token pseudo-random code against an expected value. If the token presence data comprises dynamically-generated data, the Relying Party Server 140 has a copy of the diversified key of the hardware token 110, and validates the credential by generating a reference value from the random number, the internal card counter number and the diversified key, and comparing the generated reference value against the received dynamically-generated data.

Alternatively, the Relying Party Server 140 or the Token Manager 100 may provide a random datum, such as an unpredictable number, to the hardware token 110, and the hardware token 110 may generate dynamic data by signing the random datum with its private key (or diversified key), and send the signed datum to the Relying Party Server 140 over an encrypted channel (such as a SCP session). The Relying Party Server 140 could then decrypt the encrypted dynamic data, and validate the signed data to confirm presence of the hardware token 110.

Optionally, the Relying Party Server 140 also validates the credential by verifying that the Token Manager 100 was associated with the hardware token 110 during the Registration process. To do so, the Relying Party Server 140 may correlate identifying data of the Token Manager 100 and identifying data of the hardware token 110 with the Token Manager-hardware token association established in the Registration process. For example, the Relying Party 140 may verify that the Serial Number 321 that was included in the credential was linked to the identifying data of the hardware token 110 (via the User-ID) during the Registration process.

The Relying Party Server 140 also validates the credential by verifying that it had associated the received session token with the User-ID, and that the association is still valid. If the association between the received session token and User-ID is still valid (and, optionally, the Token Manager 100 was previously associated with the hardware token 110), the credential is validated and, at step S910, the Relying Party Server 140 establishes a new communication session with the browser 400. Preferably, the browser 400 and the Relying Party Server 140 establish an encrypted session, using an authentication payload, such as the Relying Party Server's Public Certificate WSRPPubC, in the conventional manner. More preferably, the browser 400 and the Relying Party Server 140 establish a mutually-authenticated encrypted TLS session. If the credential comprised the Session Certificate SCert, preferably the Relying Party Server 140 transmits the authentication payload to the browser 400, thereby allowing the browser 400 and the Relying Party Server 140 to establish the mutually authenticated TLS session using the Session Certificate SCert and the Relying Party Server's Public Certificate WSRPPubC. If the credential comprised the pseudo-random code instead of the Session Certificate SCert, the Network Client 345 may provide the Relying Party Server 140 with a public certificate of the Token Manager 100, such as the User-RP Public Certificate URPPubC, to facilitate establishment of the mutually authenticated session.

After the TLS session is established, the user of the Computer Host 120 may access the resources of the Relying Party Server 140, such as secure online accounts or databases, or use the resources to securely download or upload files from/to the Relying Party Server 140. Alternately, if the hardware token 110 includes a secure element (similar to the Secure Element 200 of the Token Manager 100), the user of the Computer Host 120 may use the resources of the Relying Party Server 140 to securely update data or programs stored on the hardware token 110. Similarly, if the Token Manager 100 is implemented as self-contained form-factor, the user of the Computer Host 120 may use the resources of the Relying Party Server 140 to securely update data or programs stored on the Token Manager 100.

Before doing so, preferably the Token Manager 100 and the Activation Server 150 establish an encrypted session, such as a GlobalPlatform Secure Channel Protocol (SCP) session, within the TLS session, to thereby encrypt communications between the Token Manager 100 and the Activation Server 150. Once the SCP session is established, the Relying Party Server 140 generates a set of initial Application Protocol Data Units (APDU) commands which, when executed on the hardware token 110 (or on the Secure Element 200), would update the hardware token 110 (Token Manager 100). Preferably, the APDU commands are encrypted using the public key of the hardware token public certificate CPubC (THPubC), and are sent to the hardware token 110 (or the Token Manager 100), via the Network Client 345, using browser cookies.

The APDU commands may enable electronics on the hardware token 110 to update the magnetic stripe of the hardware token 110. Brown (US Patent App 20070241201) teaches updating the magnetic stripe of a card having electronics and a battery embedded within the card. Other methods for updating the magnetic stripe of the hardware token 110 are contemplated herein, including using the power provided by the magnetic field of the Token Manager interface 270, thereby eliminating the need to have a battery embedded within the hardware token 110.

When the Network Client 345 receives the browser cookie from the Relying Party Server 140, it forwards the cookie data to the Token Manager 100. If the Token Manager 100 is implemented as a self-contained form-factor, the APDUs may be decrypted by the Token Manager 100 using the private key THPrivK, and then executed by the Secure Element 200 of the Token Manager 100. Alternately, if the hardware token 110 is interfaced with the Token Manager 100, the Token Manager 100 may forward the encrypted APDUs to the hardware token 110 via the Token Manager interface 270. The encrypted APDUs may then be decrypted by the hardware token 110 using its private key CPrivK, and then executed by the secure element of the hardware token 110. Responses to the APDU commands may be sent by the Network Client 345 to the Relying Party Server 140 as browser cookies, or other forms of communications such as browser redirects, or direct TCP/IP communication.

The Relying Party Server 140 may determine from the APDU responses whether the hardware token 110 (Token Manager 100) was successfully updated. If updated successfully, the Relying Party Server 140 may send a Finish command to the hardware token 110 (Token Manager 100) via the same channel it sent the encrypted APDUs. Otherwise, the Relying Party Server 140 may generate and send another set of encrypted APDUs, and continue this process, until the hardware token 110 (Token Manager 100) is successfully updated.

Token Manager Activation (Embodiment #2)

Figure 8A:
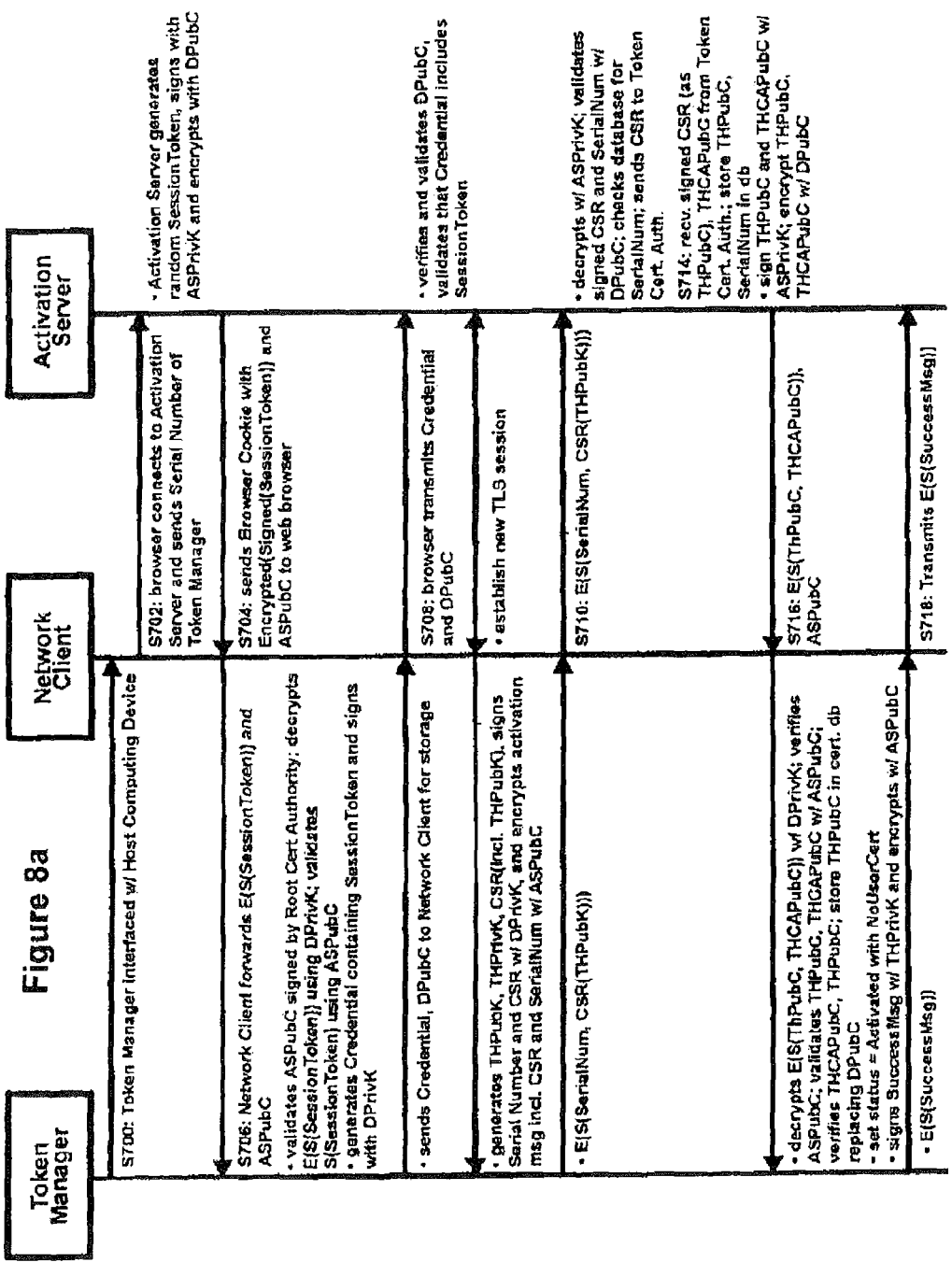
FIGS. 8a and 8b together comprise a message flow diagram that depicts the transmission of messages during an Activation process implemented by a second embodiment of the Token Manager.
Figure 8B:
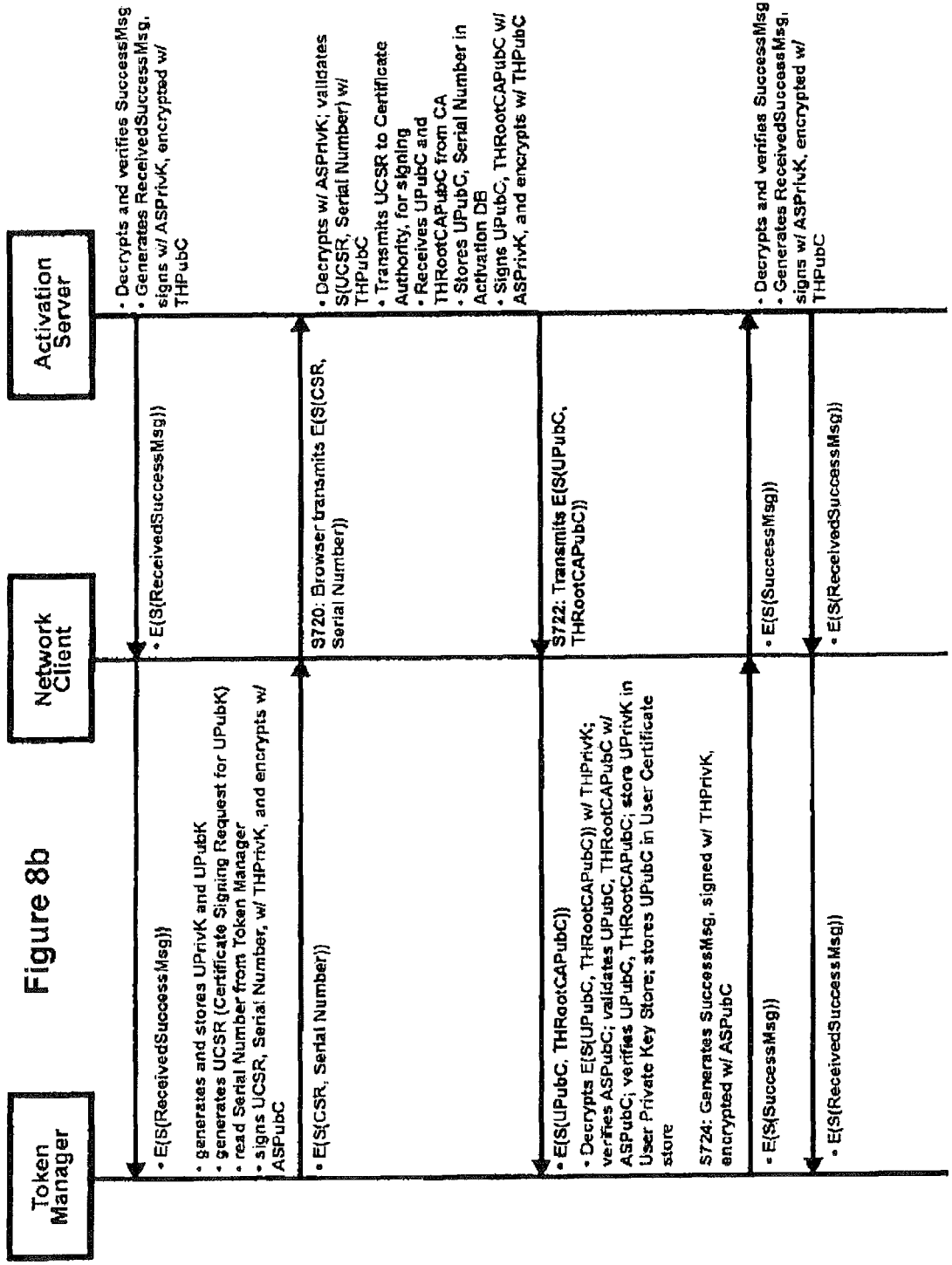

The Activation process that is implemented by the second embodiment of the Token Manager 100 will now be described with reference to FIGS. 8*a* and 8*b*. As in the first embodiment, the Token Manager 100 may include a Distribution Public Certificate DPubC, and a corresponding Distribution private encryption key DPrivK. The Activation process causes the Token Manager 100 to replace the Distribution private encryption key DPrivK and the Distribution Public Certificate DPubC respectively with a Token Manager private key THPrivK and a Token Manager digital public certificate THPubC. However, in contrast to the first embodiment, the Activation process may also cause the Token Manager 100 to be provided with a User private encryption key UPrivK and a Certificate Authority-signed User digital public certificate UPubC that includes a User public encryption key UPubK corresponding to the User private encryption key UPrivK. The Activation Server 150 associates the Token Manager public certificate THPubC and the User Public Certificate UPubC with the Serial Number 321 of the Token Manager 100, thereby uniquely associating the Token Manager public certificate THPubC and the User Public Certificate UPubC with the Token Manager 100. The User Public Certificate UPubC is common for all of the Relying Party Servers 140, and is used to register the Token Manager 100 for each Relying Party Server 140.

Alternately, the Activation process might not cause the Token Manager 100 to be provided with a User private encryption key UPrivK and corresponding User digital public certificate UPubC, in which case the Token Manager public certificate THPubC could be used to register the Token Manager 100 for each Relying Party Server 140.

Steps S700 to S716 of the Activation process are the same as in the first embodiment. However, if the signature on the Token Manager's Public Certificate THPubC is valid, the Token Manager 100 updates the Token Status 322 to "Activated with NoUserCert". The Token Manager 100 or Network Client 345 then generates a Successful Update Notification message, signs the Successful Update Notification message with the Token Manager's Private Key THPrivK, encrypts the signed message with the Activation Server's Public Certificate ASPubC, and transmits the encrypted message to the Activation Server 150, at step S718. The Activation Server 150 decrypts and verifies the Successful Update Notification message, as described above.

The Activation Server 150 then generates a Received Successful Update Notification message, signs the Received Successful Update Notification message with the Activation Server's Private Key ASPrivK, encrypts the signed message with the Token Manager's Public Certificate THPubC, and transmits the encrypted message to the Network Client 345. The Token Manager 100 or the Network Client 345 decrypts the encrypted message with the Token Manager Private Key THPrivK, and verifies the signature on the Received Successful Update Notification message using the Activation Server's Public Certificate ASPubC.

Upon successful verification of the Received Successful Update Notification message, the Token Manager 100 may generate a new User Private Key UPrivK and a corresponding User Public Key UPubK, and store the private key UPrivK and the public key UPubK respectively in the Private Key store 332 and the Certificate store 333. The User private key UPrivK and the User public key UPubK comprise an asymmetric encryption key pair. The User Private Key UPrivK and the corresponding User Public Key UPubK are uniquely associated with the Token Manager 100.

The Token Manager 100 or the Network Client 345 may then generate a User Certificate Signing Request UCSR for the creation of a User Public Certificate UPubC based on the User Public Key UPubK. The User Certificate Signing Request UCSR includes the User Public Key UPubK. The Token Manager 100 or the Network Client 345 also signs the UCSR and the Serial Number 321 with the Token Manager THPrivK. Preferably, the Token Manager 100 or the Network Client 345 then generates an encrypted activation message by encrypting the signed UCSR and Serial Number 321 with the Activation Server's Public Certificate ASPubC.

At step S720, the Network Client 345 uses the browser 400 to transmit the encrypted activation message to the Activation Server 150. The Activation Server 150 decrypts the encrypted activation message using the Activation Server's Private Key ASPrivK, and validates the signed UCSR and the signed Serial Number 321 using the Token Manager's Public Certificate THPubC. After the Activation Server 150 has validated this data, the Activation Server 150 transmits the User Certificate Signing Request UCSR to the Certificate Authority 170 for signing. The Certificate Authority 170 signs the UCSR, and returns the resulting Certificate Authority-signed User Certificate UPubC, together with the Certificate Authority's Public Certificate THRootCAPubC, to the Activation Server 150. The Activation Server 150 stores the User Public Certificate UPubC, together with the Serial Number 321, in the Activation Database 535. As will become apparent, the User Public Certificate UPubC serves as an authentication payload that facilitates authentication of the Network Client 345 to the Relying Party Server 140.

The Activation Server 150 signs the authentication payload and the Certificate Authority's Public Certificate THRootCAPubC with the Activation Server's Private Key ASPrivK. The Activation Server 150 then generates an encrypted message by encrypting the signed authentication payload and the signed Certificate Authority's Public Certificate THRootCA-PubC using the Token Manager Public Certificate THPubC. At step S722, the Activation Server 150 transmits the encrypted message to the Network Client 345.

The Token Manager 100 or the Network Client 345 decrypts the encrypted message using the Token Manager Private Key THPrivK, and verifies that the Activation Server's Public Certificate ASPubC was signed by the Root Certificate Authority. If verified, the Token Manager 100 or the Network Client 345 validates the signed User Public Certificate UPubC and the signed Certificate Authority's Public Certificate THRootCAPubC using the Activation Server's Public Certificate ASPubC.

If the User Public Certificate UPubC and the Certificate Authority's Public Certificate THRootCAPubC are validated, the Token Manager 100 or the Network Client 345 verifies that Certificate Authority's Public Certificate THRootCAPubC was signed by the Root Certificate Authority. If verified, the Token Manager 100 or the Network Client 345 uses the Certificate Authority's Public Certificate THRootCAPubC to verify that the User Public Certificate UPubC was signed by the Certificate Authority 170. If the signature on the User Public Certificate UPubC is invalid, an error is raised and the Activation process aborts. Otherwise, the Token Manager 100 saves the User Private Key UPrivK in the User Private Key store 326, and saves the User Public Certificate UPubC in the User Certificate store 327. The Token Manager 100 then updates the Token Status 322 to "Activated with UserCert". Since the User Private Key UPrivK and the corresponding User Public Key UPubK are uniquely associated with the Token Manager 100, the User Public Certificate UPubC is uniquely associated with the Token Manager 100.

At step S724, the Token Manager 100 or the Network Client 345 then generates a Successful Update Notification message, signs the Successful Update Notification message with the Token Manager Private Key THPrivK, encrypts the signed message with the Activation Server's Public Certificate ASPubC, and transmits the encrypted message to the Activation Server 150. The Activation Server 150 decrypts the encrypted message with the Activation Server's Private Key ASPrivK, and then verifies the signature on the Successful Update Notification message using the Token Manager's Public Certificate THPubC.

In response, the Activation Server 150 generates a Received Success message, signs the Received Success message with the Activation Server's Private Key ASPrivK, encrypts the signed message with the Token Manager's Public Certificate THPubC, and transmits the encrypted message to the Network Client 345. The Token Manager 100 or the Network Client 345 decrypts the encrypted message with the Token Manager Private Key THPrivK, and then verifies the signature on the Received Success message using the Activation Server's Public Certificate ASPubC. The Activation process ends upon successful verification of the Received Success message.

If the Token Manager 100 is implemented either as a plug-in peripheral or as an internal device to the Computer Host 120, configured to interface with a hardware token 110, one or more of the foregoing steps of the Token Manager 100 may be performed by the hardware token 110.

Token Manager Registration (Embodiment #2)

Figure 9A:
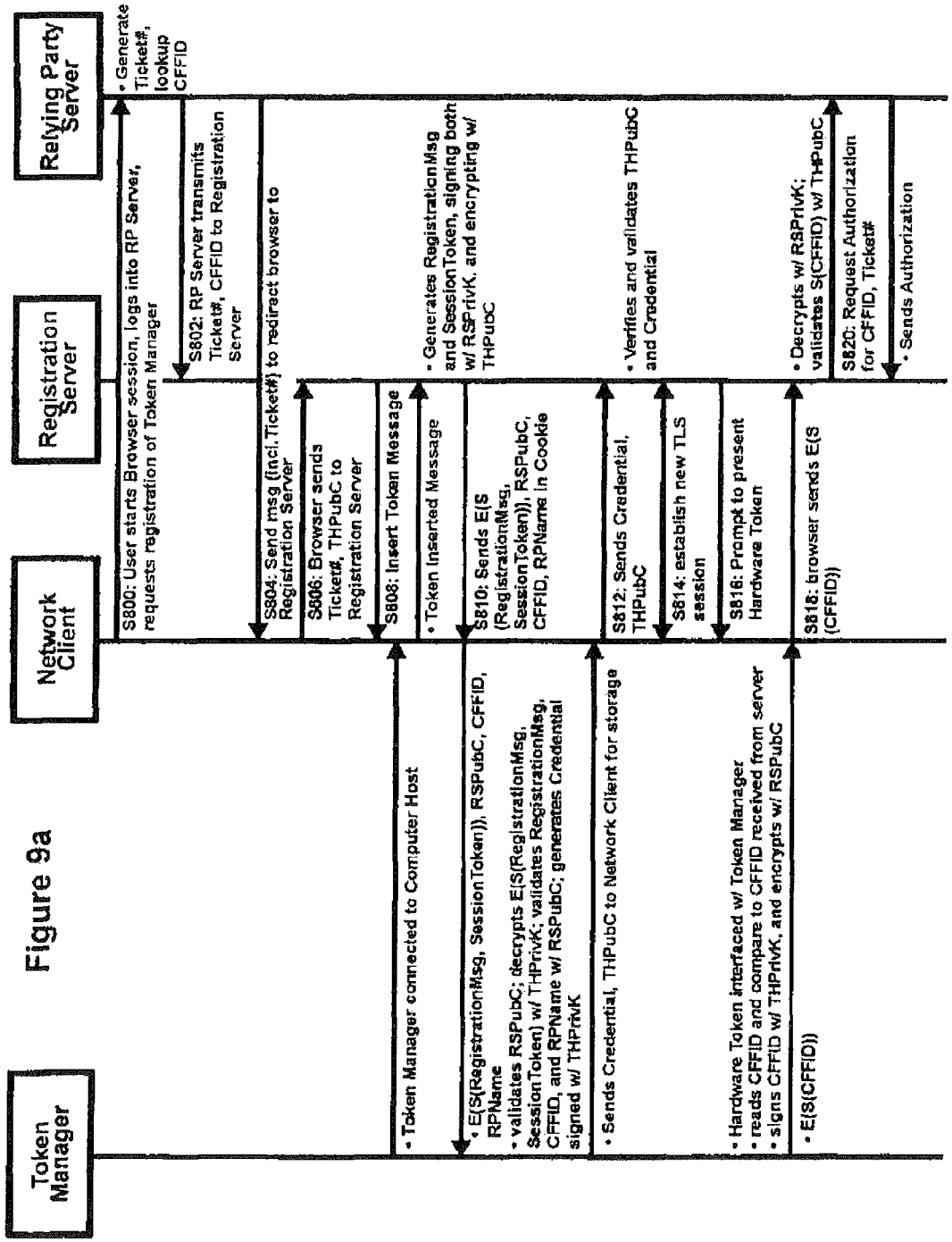
FIGS. 9a and 9b together comprise a message flow diagram that depicts the transmission of messages during a Registration process implemented by the second embodiment of the Token Manager.
Figure 9B:
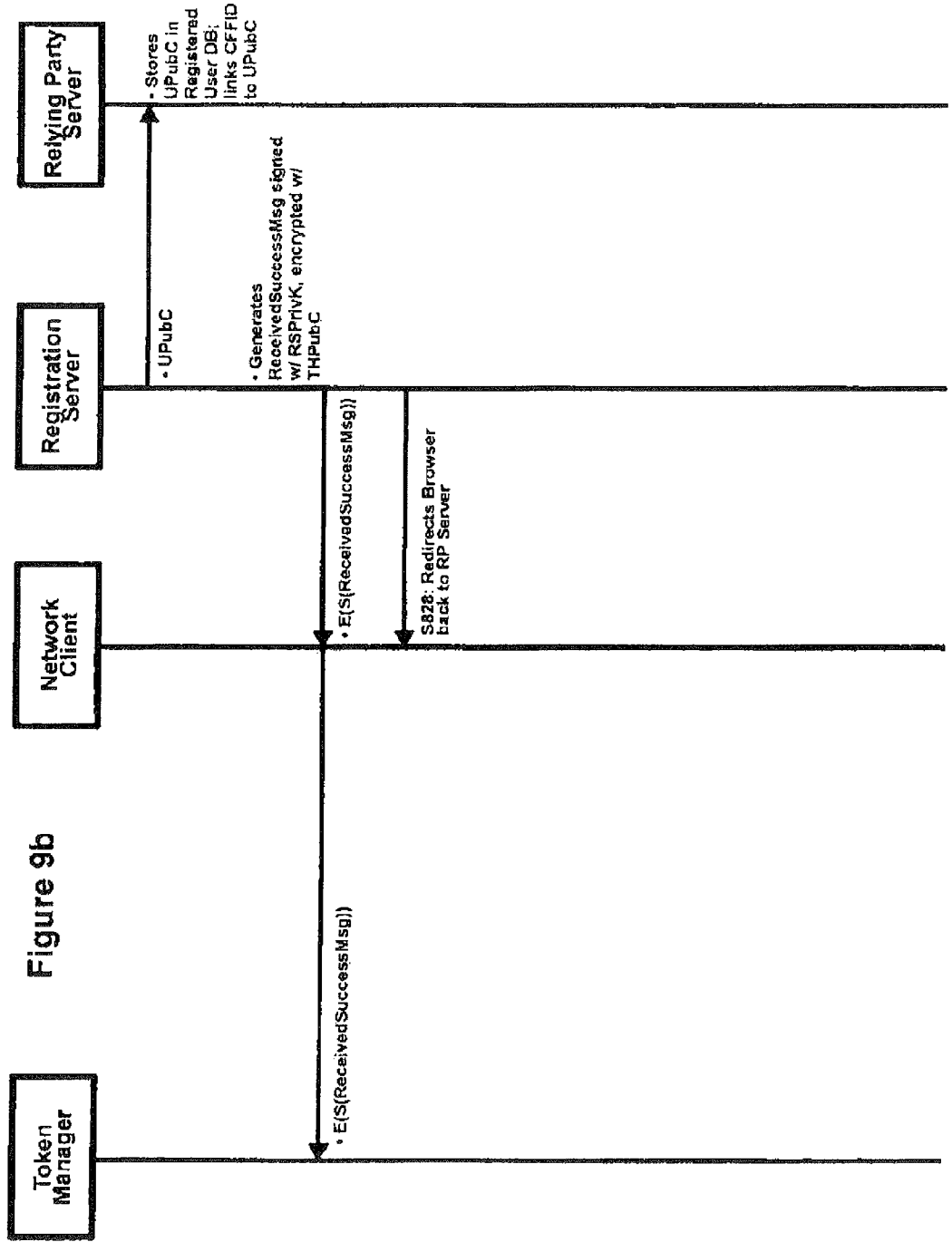

The Registration process that is implemented by the second embodiment of the Token Manager 100 will now be described with reference to FIGS. 9a and 9b. As in the first embodiment, the Token Manager 100 includes a Token Manager Public Certificate THPubC, and a corresponding private encryption key THPrivK. However, in contrast to the first embodiment, the Token Manager 100 may also include a User private encryption key UPrivK and a Certificate Authority-signed User digital public certificate UPubC that includes a User public encryption key UPubK corresponding to the User private encryption key UPrivK. The Activation Server 150 has a copy of the Token Manager Public Certificate THPubC and the User public certificate UPubC, and maintains a link between the Token Manager Public Certificate THPubC, the User public certificate UPubC and the associated Token Manager 100.

The Token Manager 100 uses the User public certificate UPubC to register the Token Manager 100 for use with each Relying Party Server 140. The Registration process causes the Relying Party Server 140 to be provided with a copy of the User public certificate UPubC, and to associate the User public certificate UPubC with a hardware token 110 provided or trusted by the Relying Party. The Token Manager 100 register the same User public certificate UPubC with each Relying Party Server 140, such that the User public certificate UPubC is common to all of the Relying Party Servers 140. Alternately, as discussed above, the Activation process might not provide the Token Manager 100 with a User public certificate UPubC, in which case the Token Manager 100 may use the Token Manager public certificate THPubC to register the Token Manager 100 with each Relying Party Server 140.

Steps S800 to S814 of the Registration process are the same as in the first embodiment. If the browser 400 and the Registration Server 160 are able to establish a session, at step S816 the Registration Server 160 causes the browser 400 to display a message instructing the user to physically interface an authenticator with the Computer Host 120. In response, typically the user will interface a hardware token 110 with the Token Manager 100 (unless the Token Manager 100 is implemented as a self-contained plug-in peripheral or a self-contained contactless device where the functionality of the hardware token 110 is embedded in the Token Manager 100).

After the hardware token 110 is physically interfaced with the Token Manager 100, the Token Manager 100 or the Network Client 345 may validate data originating from the hardware token 110. To do so, the Token Manager 100 may read identifying data from the hardware token 110, and the Token Manager 100 or the Network Client 345 may determine whether the identifying data that was read from the hardware token 110 matches any one of the received CFFIDs required by the Relying Party Server 140 (transmitted to the Token Manager 100 by the Registration Server 160). Alternately, if the Token Manager 100 is implemented as a self-contained plug-in peripheral or a self-contained contactless device where the functionality of the hardware token 110 is embedded in the Token Manager 100, the Token Manager 100 or Network Client 345 may determine whether identifying data that was read from the Token Manager 100 (such as the Serial Number 321) matches the received CFFID. As discussed above, typically the CFFID is uniquely associated with the authenticator (e.g. Token Manager 100, hardware token 110). However, the CFFID may identify a group or class type of authenticator.

If the CFFID reveals that that the identifying data that originated from the hardware token 110 (or the Token Manager 100) is not valid, an error is raised and the Registration process ends. However, if the CFFID reveals that the identifying data that originated from the hardware token 110 (or the Token Manager 100) is valid, the Token Manager 100 or the Network Client 345 signs the Token Manager Serial Number 321 and the identifying data read from the hardware token 110 (or the Token Manager 100) with the Token Manager THPrivK.

Optionally, the Token Manager 100 may request token presence data from the hardware token 110, and sign the token presence data with the Token Manager private key THPrivK. Typically the token presence data is different from the identifying data, and is used by the Relying Party Server 140 to confirm that the hardware token 110 was physically presented to the Token Manager 100 during the Registration process. The token presence data may comprise a static secret, or a token pseudo-random code, such as a Token One-Time Password (TOTP), generated by a Chip Authentication Program application on the hardware token 110. Alternately, the token presence data may comprise dynamically-generated data.

If the hardware token 110 is configured as an EMV payment card, the dynamically-generated data may comprise a cryptogram, that is generated from data originating from the hardware token 110. To compute the cryptogram, the Token Manager 100 may send a random number to the hardware token 110, and the hardware token 110 generates the cryptogram from the random number, an internal card counter number and a diversified key, such as a triple-DES (Data Encryption Standard) key, of the hardware token 110. The hardware token 110 may then send the cryptogam to the Token Manager 100.

If the hardware token 110 is configured as a magnetic stripe card, the dynamically-generated data token may comprise a dynamic Card Verification Value (CVV) that is generated from data originating from the hardware token 110. To compute the dynamic CVV, the Token Manager 100 may send a random number to the hardware token 110, and the hardware token 110 generates the dynamic CVV from the random number, an internal card counter number and a diversified key of the hardware token 110. The hardware token 110 may then send the dynamic CVV to the Token Manager 100, either as part of the hardware token's Track 2 discretionary data, or independently of any Track 2 discretionary data.

Alternately, if the hardware token 110 is configured as a EMV payment card, the token presence data may comprise a dynamic CVV that is generated from data originating from the hardware token 110. To compute the dynamic CVV, the Token Manager 100 may request an internal card counter number and a diversified key, such as a triple-DES key, from the hardware token 110. The Token Manager 100 may then generate a random number, and compute the dynamic CVV using the random number, the internal card counter number and the diversified key as inputs to a suitable cipher algorithm.

Preferably, the Token Manager 100 or the Network Client 345 then generates an encrypted registration message by encrypting the signed Token Manager Serial Number 321 and signed identifying data (and, if generated, the token presence data, random number and internal card counter) with the Registration Server's Public Certificate RSPubC.

At step S818, the Network Client 345 uses the browser 400 to transmit the encrypted registration message to the Registration Server 160. The Registration Server 160 decrypts the encrypted registration message using the Registration Server's Private Key RSPrivK, and validates the signed identifying data using the Token Manager's Public Certificate THPubC. After the Registration Server 160 has validated this data, at step S820 the Registration Server 160 transmits to the Relying Party Server 140, over a secure channel, a Registration Authorization request message that includes the Registration Ticket number (previously transmitted by the browser 400 to the Registration Server 160 at step S806) and the identifying data (and, if generated, the token presence data, random number and internal card counter).

In the variation where the hardware token 110 generated token presence data, the Relying Party Server 140 may validate the token presence data by comparing the token presence data against an expected value for the token presence data. This latter step allows the Relying Party Server 140 to verify that the hardware token 110 was actually presented during the Registration process. As will be apparent, if the token presence data comprises a token pseudo-random code or static secret, the Relying Party Server 140 validates the credential by comparing the token pseudo-random code against an expected value. If the token presence data comprises dynamically-generated data, the Relying Party Server 140 typically already has a copy of the diversified key of the hardware token 110, and validates the credential by generating a reference value from the random number, the internal card counter number and the diversified key, and comparing the generated reference value against the received dynamically-generated data.

Alternatively, the Relying Party Server 140 or the Token Manager 100 may provide a random datum, such as an unpredictable number, to the hardware token 110, and the hardware token 110 may generate dynamic data by signing the random datum with its private key (or diversified key), and send the signed datum to the Relying Party Server 140 over a secure channel (such as a SCP session). The Relying Party Server 140 could then decrypt the encrypted dynamic data, and validate the signed data to confirm presence of the hardware token 110.

If the token presence data cannot be validated, or if the Relying Party Server 140 did not associate the Registration Ticket number with the identifying data (at step S800), an error is raised and the Registration process aborts.

Otherwise, at step S822, the Relying Party Server 140 issues the Registration Server 160 an authorization message, whereupon the Registration Server 160 transmits to the Relying Party Server 140, over a secure channel, a Registration Completion message that includes the Registration Ticket number and the User Public Certificate UPubC. Optionally, the Registration Completion message also includes the Serial Number 321. The Relying Party Server 140 saves the User Public Certificate UPubC in the Registered User Database 520, and links the CFFID (and optionally the Serial Number 321) to the User Public Certificate UPubC via the User-ID. The Relying Party Server 140 also updates the Registered User Database 520 with the user's User-ID, to indicate that the user has registered a Token Manager 100 with the Relying Party.

The Registration Server 160 then generates a Received Successful Update Notification message, signs the Received Successful Update Notification message with the Registration Server's Private Key RSPrivK, encrypts the signed message with the Token Manager's Public Certificate THPubC, and transmits the encrypted message to the Network Client 345. As will be apparent, the Received Successful Update Notification message is transmitted to the Network Client 345 only if both the credential and the identifying data of the hardware token 110 are determined to be valid.

The Token Manager 100 or the Network Client 345 decrypts the encrypted message with the Token Manager Private Key THPrivK, and then verifies the signature on the Received Successful Update Notification message using the Registration Server's Public Certificate RSPubC. If the Received Successful Update Notification message is verified, the Token Manager 100 associates the User Public Certificate UPubC with the identifying data of the authenticator that was interfaced with the Computer Host 120.

As will be explained, in the Authentication process, the Token Manager 100 releases to the Relying Party Server 140 the User Public Certificate UPubC that was associated with the authenticator (or the class of authenticator) during the Registration process. The Relying Party Server 140 uses the User Public Certificate UPubC to authenticate the Token Manager 100 to the Relying Party Server 140. Therefore, the Received Successful Update Notification message serves as an authentication payload that facilitates authentication of the Network Client 345 to the Relying Party Server 140. As will be apparent, the authentication payload is transmitted to the Network Client 345 only if the credential and the identifying data (and optionally the presence data, if generated) were determined to be valid.

The Registration Process ends upon successful verification of the Received Successful Update Notification message. At step S828, the Registration Server 160 redirects the browser 400 back to the Relying Party Server 140.

If the Token Manager 100 is implemented either as a plug-in peripheral or as an internal device to the Computer Host 120, configured to interface with a hardware token 110, one or more of the foregoing steps of the Token Manager 100 may be performed by the hardware token 110.

Token Manager Authentication (Embodiment #2)

The Authentication process that is implemented by the second embodiment of the Token Manager 100 will now be described with reference to FIGS. 9a and 9b. In this embodiment, the Token Manager 100 includes a User public certificate UPubC, and corresponding private encryption key UPrivK. The User public certificate UPubC is uniquely associated with one of the Token Managers 100 while also being associated with one or more Relying Party Servers 140. The User public certificate UPubC is also associated with one or hardware tokens 110. Each Relying Party Server 140 has a copy of the User public certificate UPubC, and maintains a link between the User public certificate UPubC, the User-ID, and the CFFID of and the associated hardware token 110 (and optionally the Token Manager Serial Number 321).

The Authentication process causes the Token Manager 100 to authenticate itself to one of the Relying Party Servers 140, by providing the Relying Party Server 140 with a credential that is generated from the User public certificate UPubC. Preferably, the user presents a hardware token 110 to the Token Manager 100, and the Token Manager 100 releases the credential to the Relying Party Server 140 only upon successfully verifying that the same hardware token 110 (or a hardware token 110 of the same group or class type) was presented to the Token Manager 100 during the Registration of the User public certificate UPubC.

The Authentication process also causes the Relying Party 140 to verify that the credential was generated from the User public certificate UPubC that was registered with the Relying Party Server 140. As a result, verification of the credential allows the Relying Party Server 140 to verify that an authentic Token Manager 100 was used during the Authentication process. The credential may include data originating from the hardware token 110. The Authentication process may also cause the Relying Party Server 140 to validate the data of the hardware token 110, and thereby confirm that the correct hardware token 110 was physically presented to the Token Manager 100 during the Authentication process. The Authentication process may also cause the Relying Party Server 140 to verify that the Token Manager 100 is the same Token Manager as was associated with the hardware token 110 during the Registration process.

Steps S900 to S906 of the Authentication process are the same as in the first embodiment. After the Relying Party Server 140 sends the authentication message to the browser 400 at step S906, the Network Client 345 causes the browser 400 to display a message instructing the user to physically interface an authenticator with the Computer Host 120. The Token Manager 100 reads identifying data from the hardware token 110 (or its own identifying data), and then queries the Form Factor Details store 329 with the identifying data for the associated User Public Certificate UPubC that was registered with the Relying Party Server 140. Depending on the CFFID-User Public Certificate UPubC association, the user may be required to present the same Token Manager 100 or hardware token 110 that was presented during the Registration process, or may be required to only present a Token Manager 100 or hardware token 110 of the same group or class type as presented during the Registration process.

The Token Manager 100 decrypts the authentication message using the User Public Certificate UPubC, and then verifies that the Relying Party Server's Public Certificate WSRPPubC was signed by the Root Certificate Authority. If verified, the Token Manager 100 validates the signed random number RN, and the signed CFFID using the Relying Party Server's Public Certificate WSRPPubC. If the authentication message included a signed server pseudo-random code, the signed server pseudo-random code may be validated using the Relying Party Server's Public Certificate WSRPPubC. The server pseudo-random code itself may be validated by comparing the server pseudo-random code against an expected value for the pseudo-random code. If the Token Manager 100 is implemented as a self-contained plug-in peripheral or a self-contained contactless device where the functionality of the hardware token 110 is embedded in the Token Manager 100, the server pseudo-random code may be validated by a suitable application on the Token Manager 100, such as the One-Time-Password application. Alternately, if the Token Manager 100 is implemented as a plug-in peripheral or as an internal device to the Computer Host 120, configured to interface with a hardware token 110, and the hardware token 110 includes a Chip Authentication Program application, the server pseudo-random code may be validated by the hardware token 110.

The Token Manager 100 or the Network Client 345 may then validate the hardware token 110. To do so, the Token Manager 100 may determine whether the identifying data that was read from the hardware token 110 matches the CFFID that was transmitted to the Token Manager 100 by the Relying Party Server 140. Alternately, if the Token Manager 100 is implemented as a self-contained plug-in peripheral or a self-contained contactless device where the functionality of the hardware token 110 is embedded in the Token Manager 100, the Token Manager 100 may determine whether the identifying data that was read from the Token Manager 100 (such as the Serial Number 321) matches the received CFFID.

If the CFFID reveals that that the hardware token 110 (or the Token Manager 100) is not valid, an error is raised and the Authentication process ends. However, if the CFFID reveals that the hardware token 110 (or the Token Manager 100) is valid, the Token Manager 100 or the Network Client 345 generates a credential from the User Public Certificate UPubC.

As discussed above, the Token Manager 100 or the Network Client 345 may implement the credential as a digital Session Certificate SCert. Optionally, the Token Manager 100 may also generate a pseudo-random code, such as a One-Time-Password (OTP), and incorporate the pseudo-random code into the Session Certificate SCert. Optionally (either in addition to or instead of the pseudo-random code of the Token Manager 100), the Token Manager 100 may request token presence data from the hardware token 110, and incorporate the presence data into the Session Certificate SCert. As mentioned, the Relying Party Server 140 uses the token presence data to confirm that the hardware token 110 was physically presented to the Token Manager 100 during the Authentication process.

The token presence data may comprise a static secret or a token pseudo-random code, such as a Token One-Time Password (TOTP), that originates from the hardware token 110. Alternately, the token presence data may comprise dynamically-generated data. If the hardware token 110 is configured as an EMV payment card, the dynamically-generated data may comprise a cryptogram, that is generated from the random number of the Token Manager 100, an internal card counter number and a diversified key of the hardware token 110. Similarly, if the hardware token 110 is configured as a magnetic stripe card, the dynamically-generated data token may comprise a dynamic Card Verification Value (CVV) that is generated from the dynamically-generated data may comprise a cryptogram, that is generated from the random number of the Token Manager 100, an internal card counter number and a diversified key of the hardware token 110.

The Token Manager 100 or the Network Client 345 then signs the Session Certificate SCert with the User private key UPrivK. As discussed above, since the Session Certificate SCert is derived from the User Public Certificate UPubC, the Session Certificate SCert is a "child" certificate of the User Public Certificate UPubC, and the User Public Certificate UPubC is a "parent" certificate of the Session Certificate SCert.

Since the Session Certificate SCert includes the session token that was received from the Relying Party Server 140, the Session Certificate SCert is uniquely associated with the Relying Party Server 140, in the sense that no other Session Certificate SCert signed with the User private key UPrivK would have this session token. Moreover, since the Session Certificate SCert is signed with the User private key UPrivK, the Session Certificate SCert is uniquely associated with the Token Manager 100 in the sense that no other Token Manager 100 could have generated this Session Certificate SCert. Therefore, this Session Certificate SCert is uniquely associated with the Token Manager 100 and the Relying Party Server 140, in the sense that this Session Certificate SCert is only associated with this combination of Token Manager 100 and Relying Party Server 140. Further, if the Session Certificate SCert includes token presence data, the Session Certificate SCert is uniquely associated with the hardware token 110, and is also uniquely associated with the hardware token 110, Token Manager 100 and Relying Party Server 140 in the sense that this Session Certificate SCert is only associated with this combination of hardware token 110, Token Manager 100 and Relying Party Server 140.

Alternately, instead of implementing the credential as a digital certificate, the Token Manager 100 may implement the credential as a pseudo-random code, such as a One-Time-Password (OTP). Optionally (either in addition to or instead of the pseudo-random code of the Token Manager 100), the Token Manager 100 may request token presence data from the hardware token 110, and implement the credential as token presence data (with or without the pseudo-random code of the Token Manager 100. The token presence data may comprise a static secret or a token pseudo-random code, such as a Token One-Time Password (TOTP), be generated by a Chip Authentication Program application on the hardware token 110. Alternately, as discussed above, the token presence data may comprise dynamically-generated data that is generated from a random number of the Token Manager 100, an internal card counter number and a diversified key of the hardware token 110.

The Token Manager 100 or the Network Client 345 may sign the pseudo-random code (and, if generated, the token presence data, random number and internal card counter) with the User private key UPrivK. Since the pseudo-random code and the token presence data is signed with the User private key UPrivK, the signed pseudo-random code and the token presence data is associated with the Token Manager 100. Since the pseudo-random code and the token presence data is signed with the User private key UPrivK, the pseudo-random code is uniquely associated with the Token Manager 100 in the sense that no other Token Manager 100 could have generated this pseudo-random code. Moreover, if the credential includes the token presence data, the credential is uniquely associated with the hardware token 110, and is also uniquely associated with the hardware token 110, Token Manager 100 and Relying Party Server 140 in the sense that this credential is only associated with this combination of hardware token 110, Token Manager 100 and Relying Party Server 140.

The Network Client 345 then uses the browser 400 to transmit the credential and the User Public Certificate UPubC to the Relying Party Server 140, at step S908. The Relying Party Server 140 then validates the credential. To do so, the Relying Party Server 140 verifies that the User Public Certificate UPubC was signed by the Root Certificate Authority and, if verified, validates the credential using the User Public Certificate UPubC, thereby verifying that the credential was generated from the User Public Certificate UPubC and is uniquely associated with the Token Manager 100. If the credential included the session token, the Relying Party Server 140 may also validate the credential by verifying that the session token included in the credential matches the session token transmitted by the Relying Party Server 140, thereby verifying that the credential is uniquely associated with the Token Manager 100 and the Relying Party Server 140. If the credential included a pseudo-random code (whether transmitted as part of the Session Certificate SCert, or without any Session Certificate SCert), the Relying Party Server 140 may also validate the credential by comparing the pseudo-random code against an expected value for the pseudo-random code. Similarly, if the credential included card presence data (whether transmitted as part of the Session Certificate SCert, or without any Session Certificate SCert), the Relying Party Server 140 may also validate the credential by comparing the card presence data against an expected value for the card presence data. This latter step allows the Relying Party to verify that the hardware token 110 that was presented during the Authentication process is the same (or is of the same group or class type) as the hardware token 110 that was presented during the Registration process. Optionally, the Relying Party Server 140 also validates the credential by verifying that the Token Manager 100 was associated with the hardware token 110 during the Registration process. To do so, the Relying Party Server 140 may correlate identifying data of the Token Manager 100 and identifying data of the hardware token 110 with the Token Manager-hardware token association established in the Registration process. For example, the Relying Party 140 may verify that the Serial Number 321 that was included in the credential was linked to the identifying data of the hardware token 110 (via the User-ID) during the Registration process.

The Relying Party Server 140 also validates the credential by verifying that it had associated the received session token with the User-ID, and that the association is still valid. If the association between the received session token and User-ID is still valid (and, optionally, the Token Manager 100 was previously associated with the hardware token 110), the credential is validated and, at step S910, the Relying Party Server 140 establishes a new communication session with the browser 400. Preferably, the browser 400 and the Relying Party Server 140 establish an encrypted session, using an authentication payload, such as the Relying Party Server's Public Certificate WSRPPubC, in the conventional manner. More preferably, the browser 400 and the Relying Party Server 140 establish a mutually-authenticated encrypted TLS session. If the credential comprised the Session Certificate SCert, preferably the Relying Party Server 140 transmits the authentication payload to the browser 400, thereby allowing the browser 400 and the Relying Party Server 140 to establish the mutually authenticated TLS session using the Session Certificate SCert and the Relying Party Server's Public Certificate WSRPPubC. If the credential comprised the pseudo-random code instead of the Session Certificate SCert, the Network Client 345 may provide the Relying Party Server 140 with a public certificate of the Token Manager 100, such as the User Certificate UPubC, to facilitate establishment of the mutually authenticated session.

If the user concurrently connects to multiple Relying Party Servers 140, the Token Manage 100 will only generate a single credential for all of the concurrent sessions. Therefore, the credential will include the session token from each Relying Party Server 140. When the user disconnects from a Relying Party Server 140, the Token Manager 100 will generate a new credential which will only include the session tokens that are associated with the remaining active sessions.

Alternatively, a single credential can be used for all concurrent sessions in which the session token from only the Relying Party that the user is currently performing authentication with is included. In this scenario, each time the credential is generated, a method to ensure the credential is current needs to be employed for all the other sessions. This method could be as simple as a sequence number in the serial number of the credential is incremented each time it is generated. This may be useful in communications protocols that require a renegotiation at regular intervals. Therefore, when a renegotiation of the session happens with any Relying Party, the Relying Party simply validates that the sequence number for the credential has incremented since they initially established the session with the credential.

After the Relying Party Server 140 has validated the credential, the Relying Party Server 140 verifies that it had associated the received session token with the User-ID, and that the association is still valid. Optionally, the Relying Party Server 140 also verifies the Token Manager 100 was previously associated with the hardware token 110 during the Registration process by verifying that the User-RP Public Certificate URPPubC that was received from the Network Client 345 at step S908 is the same as the User-RP Public Certificate URPPubC that was associated with the user's User-ID (and CFFID) during the Registration process. If the association between the received session token and User-ID is still valid (and, optionally, the Token Manager 100 was previously associated with the hardware token 110), at step S910 the Relying Party Server 140 establishes a new communication session with the browser 400. Preferably, the browser 400 and the Relying Party Server 140 establish an encrypted session, using an authentication payload, such as the Relying Party Server's Public Certificate WSRPPubC, in the conventional manner. More preferably, the browser 400 and the Relying Party Server 140 establish a mutually-authenticated encrypted TLS session. If the credential comprised the Session Certificate SCert, preferably the Relying Party Server 140 transmits the authentication payload to the browser 400, thereby allowing the browser 400 and the Relying Party Server 140 to establish the mutually authenticated TLS session using the Session Certificate SCert and the Relying Party Server's Public Certificate WSRPPubC.

After the TLS session is established, the user of the Computer Host 120 may access the resources of the Relying Party Server 140, such as secure online accounts or databases, or use the resources to securely download or upload files from/to the Relying Party Server 140. Alternately, as discussed above, the user of the Computer Host 120 may use the resources of the Relying Party Server 140 to securely update data or programs stored on the hardware token 110 or the Token Manager 100.

The invention claimed is:

1. A method of authenticating a network client to a computer server, the network client being configured to communicate with the computer server over a network and to communicate with a token manager, the token manager being configured to receive data originating from a hardware token interfaced with the token manager, the method comprising:
    transmitting user login credentials to the computer server;
    receiving authenticator identifying data from the computer server in response to transmission of the user login credentials;
    determining that the authenticator identifying data matches identifying data for one of the token manager and the network clients;
    one of the token manager and the network client generating a credential associated with the token manager, and transmitting the credential to the computer server, wherein the token manager is configured with a parent digital certificate associated with the token manager, the parent digital certificate including a public encryption key, and the credential generating comprises:
    the one of the token manager and the network client generating the credential from the parent digital certificate;
    the one of the token manager and the network client generating a child digital certificate from the parent digital certificate and signing the child digital certificate with a private encryption key uniquely associated with the public encryption key, the private encryption key and the public encryption key comprising an asymmetric encryption key pair;
    the one of the token manager and the network client generating a pseudo-random code, and incorporating the pseudo-random code into the child digital certificate, the pseudo-random code being verifiable by the computer server; and
    the network client receiving an authentication payload from the computer server in accordance with a validity of the credential and the data of the hardware token, the authentication payload facilitating authentication of the network client to the computer server.

2. The method according to claim 1, wherein the transmitting the credential comprises the one of the token manager and the network client determining a validity of the data of the hardware token, and transmitting the credential and the data of the hardware token in accordance with an outcome of the determining the validity of the data of the hardware token.

3. The method according to claim 2, wherein the determining the validity of the data of the hardware token comprises the one of the token manager and the network client comparing the data of the hardware token with expected data received from the computer server.

4. The method according to claim 1, wherein the credential generating comprises the one of the token manager and the network client incorporating the data of the hardware token into the credential.

5. The method according to claim 1, wherein the credential is uniquely associated with the token manager and the computer server.

6. The method according to claim 1, wherein the hardware token is associated with an entity other than the computer server.

7. The method according to claim 1, wherein the credential generating comprises the one of the token manager and the network client signing the pseudo-random code with the private key uniquely associated with the public encryption key.

8. The method according to claim 1, further comprising the one of the token manager and the network client receiving a server digital certificate associated with the computer server, and the generating the credential comprises the one of the token manager and the network client generating the credential after validating the server digital certificate.

9. The method according to claim 8, further comprising, prior to the network client receiving the authentication payload from the computer server, the one of the token manager and the network client receiving a signed message from the computer server and authenticating the computer server by verifying the signed message from the server digital certificate, and the generating the credential comprises the one of the token manager and the network client generating the credential in accordance with an outcome of the computer server authenticating.

10. The method according to claim 9, wherein the digitally-signed message includes a server pseudo-random code, and the computer server authenticating comprises the one of the token manager and the network client comparing the server pseudo-random code with a pseudo-random code expected for the computer server.

11. A non-transitory computer-readable medium comprising computer processing instructions stored thereon for execution by a computer, the computer processing instructions, when executed by the computer, causing the computer to perform a method of authenticating a network client to a computer server, the network client being configured to communicate with the computer server over a network and to communicate with a token manager, the token manager being configured to receive data originating from a hardware token interfaced with the token manager, the method comprising:
  transmitting user login credentials to the computer server;
  receiving authenticator identifying data from the computer server in response to transmission of the user login credentials;
  determining that the authenticator identifying data matches identifying data for one of the token manager and the network clients;
  one of the token manager and the network client generating a credential associated with the token manager, and transmitting the credential to the computer server, wherein the token manager is configured with a parent digital certificate associated with the token manager, the parent digital certificate including a public encryption key, and the credential generating comprises:
    the one of the token manager and the network client generating the credential from the parent digital certificate;
    the one of the token manager and the network client generating a child digital certificate from the parent digital certificate and signing the child digital certificate with a private encryption key uniquely associated with the public encryption key, the private encryption key and the public encryption key comprising an asymmetric encryption key pair;
    the one of the token manager and the network client generating a pseudo-random code, and incorporating the pseudo-random code into the child digital certificate, the pseudo-random code being verifiable by the computer server; and
  the network client receiving an authentication payload from the computer server in accordance with a validity of the credential and the data of the hardware token, the authentication payload facilitating authentication of the network client to the computer server.

12. A method of authenticating a network client to a computer server, the network client being configured to communicate with the computer server over a network and to communicate with a token manager, the method comprising:
  the computer server receiving user login credentials from the network client;
  the computer server retrieving authenticator identifying data associated with the user login credentials;
  the computer server transmitting the authenticator identifying data to the network client;
  the computer server receiving a credential from one of the token manager and the network client, wherein the token manager is configured with a parent digital certificate associated with the token manager, the parent digital certificate includes a public encryption key, and wherein the credential is generated by:
    the one of the token manager and the network client generating the credential from the parent digital certificate;
    the one of the token manager and the network client generating a child digital certificate from the parent digital certificate and signing the child digital certificate with a private encryption key uniquely associated with the public encryption key, the private encryption key and the public encryption key comprising an asymmetric encryption key pair; and
    the one of the token manager and the network client generating a pseudo-random code, and incorporating the pseudo-random code into the child digital certificate, the pseudo-random code being verifiable by the computer server; and
  the computer server transmitting an authentication payload to the network client in accordance with a determination of validity of the credential and data originating from a hardware token interfaced with the token manager, the authentication payload facilitating authentication of the network client to the computer server, wherein the determination of the validity comprises:
    verifying that the credential was signed with the private encryption key uniquely associated with the public encryption key; and
    comparing the pseudo-random code included in the credential with an expected pseudo-random code.

13. The method according to claim 12, wherein the determination of the validity comprises the computer server comparing the data of the hardware token with expected data.

14. The method according to claim 13, wherein the determination of the validity comprises the computer server verifying that the credential is associated with the token manager.

15. The method according to claim 13, wherein the determination of the validity comprises the computer server verifying that the credential is uniquely associated with the token manager and the computer server.

16. The method according to claim 12, further comprising transmitting a session token from the computer server to the one of the token manager and the network client, and the determination of the validity comprises comparing the transmitted session token with a session token included in the credential.

17. The method according to claim 12, wherein the determination of validity of the credential and the data of the hardware token comprises a determination of a correlation between identifying data of the token manager and identifying data of the hardware token, and a previous token manager-hardware token association.

18. A non-transitory computer-readable medium comprising computer processing instructions stored thereon for execution by a computer server, the computer processing instructions, when executed by the computer server, causing the computer server to perform a method of authenticating a network client to the computer server, the network client being configured to communicate with the computer server over a network and to communicate with a token manager, the method comprising:

the computer server receiving user login credentials from the network client;

the computer server retrieving authenticator identifying data associated with the user login credentials;

the computer server transmitting the authenticator identifying data to the network client;

the computer server receiving a credential from one of the token manager and the network client, wherein the token manager is configured with a parent digital certificate associated with the token manager, the parent digital certificate includes a public encryption key, and wherein the credential is generated by:

the one of the token manager and the network client generating the credential from the parent digital certificate;

the one of the token manager and the network client generating a child digital certificate from the parent digital certificate and signing the child digital certificate with a private encryption key uniquely associated with the public encryption key, the private encryption key and the public encryption key comprising an asymmetric encryption key pair; and the one of the token manager and the network client generating a pseudo-random code, and incorporating the pseudo-random code into the child digital certificate, the pseudo-random code being verifiable by the computer server; and the computer server transmitting an authentication payload to the network client in accordance with a determination of validity of the credential and data originating from a hardware token interfaced with the token manager, the authentication payload facilitating authentication of the network client to the computer server, wherein the determination of the validity comprises:

verifying that the credential was signed with the private encryption key uniquely associated with the public encryption key; and comparing the pseudo-random code included in the credential with an expected pseudo-random code.

* * * * *